US009860530B2

(12) United States Patent
Lee et al.

(10) Patent No.: US 9,860,530 B2
(45) Date of Patent: *Jan. 2, 2018

(54) METHOD AND APPARATUS FOR LOOP FILTERING

(71) Applicant: HFI Innovation Inc., Zhubei, Hsinchu County (TW)

(72) Inventors: Kun-Bin Lee, Taipei (TW); Yi-Hau Chen, Taipei (TW); Chi-Cheng Ju, Hsinchu (TW); Yu-Wen Huang, Taipei (TW); Shaw-Min Lei, Zhubei (TW); Chih-Ming Fu, Hsinchu (TW); Ching-Yeh Chen, Taipei (TW); Chia-Yang Tsai, New Taipei (TW); Chih-Wei Hsu, Taipei (TW)

(73) Assignee: HFI INNOVATION INC., Zhubei, Hsinchu County (TW)

( * ) Notice: Subject to any disclaimer, the term of this patent is extended or adjusted under 35 U.S.C. 154(b) by 463 days.

This patent is subject to a terminal disclaimer.

(21) Appl. No.: 14/348,660

(22) PCT Filed: Oct. 11, 2012

(86) PCT No.: PCT/CN2012/082782
§ 371 (c)(1),
(2) Date: Mar. 31, 2014

(87) PCT Pub. No.: WO2013/053324
PCT Pub. Date: Apr. 18, 2013

(65) Prior Publication Data
US 2014/0269913 A1 Sep. 18, 2014

Related U.S. Application Data

(60) Provisional application No. 61/547,285, filed on Oct. 14, 2011, provisional application No. 61/557,046, filed on Nov. 8, 2011.

(51) Int. Cl.
*H04N 7/12* (2006.01)
*H04N 19/172* (2014.01)
(Continued)

(52) U.S. Cl.
CPC ..... *H04N 19/00266* (2013.01); *H04N 19/117* (2014.11); *H04N 19/14* (2014.11);
(Continued)

(58) Field of Classification Search
CPC .......... H04N 19/00684; H04N 19/503; H04N 19/109; H04N 19/51; H04N 19/583
(Continued)

(56) References Cited

U.S. PATENT DOCUMENTS 8,548,041 B2   10/2013  Fu et al.
8,630,356 B2 *  1/2014  Zhang ................ H04N 19/619
                                                        348/488
(Continued)

FOREIGN PATENT DOCUMENTS

CN          102165774      8/2011
WO    WO 2011/043797      4/2011
WO    WO 2013/053314      4/2013

OTHER PUBLICATIONS

Chen, C.Y., et al.; "CE8.A.1 One-stage SAO and ALF with LCU-based syntax;" Joint Collaborative Team on Video Coding (JCT-VC) of ITU-T SG16 WP3 ISO/IEC JTC1/SC29/WG11; Feb. 2012; pp. 1-7.
(Continued)

*Primary Examiner* — Tung Vo
(74) *Attorney, Agent, or Firm* — McClure, Qualey & Rodack, LLP

(57) ABSTRACT

A method and apparatus for loop processing of reconstructed video in an encoder system are disclosed. The loop processing comprises an in-loop filter and one or more adaptive
(Continued)

filters. The filter parameters for the adaptive filter are derived from the pre-in-loop video data so that the adaptive filter processing can be applied to the in-loop processed video data without the need of waiting for completion of the in-loop filter processing for a picture or an image unit. In another embodiment, two adaptive filters derive their respective adaptive filter parameters based on the same pre-in-loop video data. In yet another embodiment, a moving window is used for image-unit-based coding system incorporating in-loop filter and one or more adaptive filters. The in-loop filter and the adaptive filter are applied to a moving window of pre-in-loop video data comprising one or more sub-regions from corresponding one or more image units.

26 Claims, 16 Drawing Sheets

(51) Int. Cl.
H04N 19/196 (2014.01)
H04N 19/176 (2014.01)
H04N 19/117 (2014.01)
H04N 19/14 (2014.01)
H04N 19/44 (2014.01)
H04N 19/82 (2014.01)
H04N 19/423 (2014.01)
H04N 19/436 (2014.01)
H04N 19/86 (2014.01)

(52) U.S. Cl.
CPC ......... *H04N 19/172* (2014.11); *H04N 19/176* (2014.11); *H04N 19/197* (2014.11); *H04N 19/423* (2014.11); *H04N 19/436* (2014.11); *H04N 19/44* (2014.11); *H04N 19/82* (2014.11); *H04N 19/86* (2014.11)

(58) Field of Classification Search
USPC .................................................. 375/240.16
See application file for complete search history.

(56) References Cited

U.S. PATENT DOCUMENTS

| | | | |
|---|---|---|---|
| 2010/0027686 A1* | 2/2010 | Zuo | G06T 9/00 375/240.29 |
| 2010/0329361 A1* | 12/2010 | Choi | H04N 19/176 375/240.29 |
| 2011/0026600 A1* | 2/2011 | Kenji | H04N 19/70 375/240.24 |
| 2011/0026611 A1* | 2/2011 | Kenji | H04N 19/0089 375/240.29 |
| 2011/0142130 A1* | 6/2011 | Lin | H04N 19/172 375/240.16 |
| 2012/0093217 A1* | 4/2012 | Jeon | H04N 19/46 375/240.02 |
| 2012/0140820 A1* | 6/2012 | Kondo | H04N 19/176 375/240.03 |
| 2012/0144048 A1* | 6/2012 | Jarvenpaa | H04L 29/1216 709/228 |
| 2012/0230423 A1* | 9/2012 | Esenlik | H04N 19/0089 375/240.24 |
| 2013/0051455 A1* | 2/2013 | Sze | H04N 19/70 375/240.02 |
| 2013/0077697 A1* | 3/2013 | Chen | H04N 19/176 375/240.25 |
| 2013/0077884 A1* | 3/2013 | Ikai | G06T 9/00 382/233 |
| 2013/0163660 A1* | 6/2013 | Boyce | H04N 19/46 375/240.02 |
| 2013/0163677 A1* | 6/2013 | Sze | H04N 19/00903 375/240.26 |
| 2013/0188686 A1* | 7/2013 | Tourapis | H04N 19/00139 375/240.02 |
| 2014/0328413 A1* | 11/2014 | Esenlik | H04N 19/197 375/240.29 |

OTHER PUBLICATIONS

Kim, W.S.; "AhG6 SAO Parameter Estimation Using Non-deblocked Pixels;" Joint Collaborative Team on Video Coding (JCT-VC) of ITU-T SG16 WP3 ISO/IEC JTC1/SC29/WG11; Jul. 2012; pp. 1-7.

Chen. C.Y., et al.; "Non-CE8.c.6 Multi-source SAO and ALF virtual boundary processing with cross9x9;" Joint Collaborative Team on Video Coding (JCT-VC) of ITU-T SG16 WP3 ISO/IEC JTC1/SC29/WG11; Nov. 2011; pp. 1-23.

McCann, K., et al.; "HM4 HEVC Test Model 4 Encoder Description;" Joint Collaborative Team on Video Coding (JCT-VC) of ITU-T SG16 WP3 ISO/IEC JTC1/SC29/SC29/WG11; Jul. 2011; pp. 1-36.

International Search Report dated Jan. 10, 2013.

English language translation of abstract of CN 102165774 (published Aug. 24, 2011).

Du, J., et al.; "A Parallel and Area-Efficient Architecture for Deblocking Filter and Adaptive Loop Filter;" IEEE International Symposium of Circuits and Systems; May 2011; pp. 945-948.

* cited by examiner

METHOD AND APPARATUS FOR LOOP FILTERING

CROSS REFERENCE TO RELATED APPLICATIONS

This application is a National Phase of PCT/CN2012/082782 filed on Oct. 12, 2011, which claims priority to U.S. Provisional Patent Application Ser. No. 61/547,285, filed Oct. 14, 2011, entitled "Parallel Encoding for SAO and ALF" and U.S. Provisional Patent Application Ser. No. 61/557,046, filed Nov. 8, 2011, entitled "Memory access reduction for in-loop filtering. The U.S. Provisional Patent Applications are hereby incorporated by reference in their entireties.

TECHNICAL FIELD

The present invention relates to video coding system. In particular, the present invention relates to method and apparatus for reducing processing delay and/or buffer requirement associated with loop filtering, such as Deblocking, Sample Adaptive Offset (SAO) and Adaptive Loop Filter (ALF), in a video encoder or decoder.

BACKGROUND

Motion estimation is an effective inter-frame coding technique to exploit temporal redundancy in video sequences. Motion-compensated inter-frame coding has been widely used in various international video coding standards. The motion estimation adopted in various coding standards is often a block-based technique, where motion information such as coding mode and motion vector is determined for each macroblock or similar block configuration. In addition, intra-coding is also adaptively applied, where the picture is processed without reference to any other picture. The inter-predicted or intra-predicted residues are usually further processed by transformation, quantization, and entropy coding to generate a compressed video bitstream. During the encoding process, coding artifacts are introduced, particularly in the quantization process. In order to alleviate the coding artifacts, additional processing has been applied to reconstructed video to enhance picture quality in newer coding systems. The additional processing is often configured in an in-loop operation so that the encoder and decoder may derive the same reference pictures to achieve improved system performance.

FIG. 1 illustrates an exemplary adaptive inter/intra video coding system incorporating in-loop filtering process. For inter-prediction, Motion Estimation (ME)/Motion Compensation (MC) 112 is used to provide prediction data based on video data from other picture or pictures. Switch 114 selects Intra Prediction 110 or inter-prediction data from ME/MC 112 and the selected prediction data is supplied to Adder 116 to form prediction errors, also called prediction residues or residues. The prediction error is then processed by Transformation (T) 118 followed by Quantization (Q) 120. The transformed and quantized residues are then coded by Entropy Encoder 122 to form a video bitstream corresponding to the compressed video data. The bitstream associated with the transform coefficients is then packed with side information such as motion, mode, and other information associated with the image unit. The side information may also be processed by entropy coding to reduce required bandwidth. Accordingly, the side information data is also provided to Entropy Encoder 122 as shown in FIG. 1 (the motion/mode paths to Entropy Encoder 122 are not shown). When the inter-prediction mode is used, a previously reconstructed reference picture or pictures have to be used to form prediction residues. Therefore, a reconstruction loop is used to generate reconstructed pictures at the encoder end. Consequently, the transformed and quantized residues are processed by Inverse Quantization (IQ) 124 and Inverse Transformation (IT) 126 to recover the processed residues. The processed residues are then added back to prediction data 136 by Reconstruction (REC) 128 to reconstruct the video data. The reconstructed video data may be stored in Reference Picture Buffer 134 and used for prediction of other frames.

As shown in FIG. 1, incoming video data undergoes a series of processing in the encoding system. The reconstructed video data from REC 128 may be subject to various impairments due to the series of processing. Accordingly, various loop processing is applied to the reconstructed video data before the reconstructed video data is used as prediction data in order to improve video quality. In the High Efficiency Video Coding (HEVC) standard being developed, Deblocking Filter (DF) 130, Sample Adaptive Offset (SAO) 131 and Adaptive Loop Filter (ALF) 132 have been developed to enhance picture quality. The Deblocking Filter (DF) 130 is applied to boundary pixels and the DF processing is dependent on the underlying pixel data and coding information associated with corresponding blocks. There is no DF-specific side information needs to be incorporated in the video bitstream. On the other hand, the SAO and ALF processing are adaptive, where filter information such as filter parameters and filter type may be dynamically changed according to underlying video data. Therefore, filter information associated with SAO and ALF is incorporated in the video bitstream so that a decoder can properly recover the required information. Therefore, filter information from SAO and ALF is provided to Entropy Encoder 122 for incorporation into the bitstream. In FIG. 1, DF 130 is applied to the reconstructed video first; SAO 131 is then applied to DF-processed video; and ALF 132 is applied to SAO-processed video. However, the processing order among DF, SAO and ALF may be re-arranged. In H.264/AVC video standard, the adaptive filters only include DF. In the High Efficiency Video Coding (HEVC) video standard being developed, the loop filtering process includes DF, SAO and ALF. In this disclosure, in-loop filter refers to loop filter processing that operates on underlying video data without the need of side information incorporated in video bitstream. On the other hand, adaptive filter refers to loop filter processing that operates underlying video data adaptively using side information incorporated in video bitstream. For example, deblocking is considered as an in-loop filter while SAO and ALF are considered as adaptive filters.

A corresponding decoder for the encoder of FIG. 1 is shown in FIG. 2. The video bitstream is decoded by Entropy Decoder 142 to recover the processed (i.e., transformed and quantized) prediction residues, SAO/ALF information and other system information. At the decoder side, only Motion Compensation (MC) 113 is performed instead of ME/MC. The decoding process is similar to the reconstruction loop at the encoder side. The recovered transformed and quantized prediction residues, SAO/ALF information and other system information are used to reconstruct the video data. The reconstructed video is further processed by DF 130, SAO 131 and ALF 132 to produce the final enhanced decoded video, which can be used as decoder output for display and is also stored in the Reference Picture Buffer 134 to form prediction data.

The coding process in H.264/AVC is applied to 16×16 processing units or image units, called macroblocks (MB). The coding process in HEVC is applied according to Largest Coding Unit (LCU). The LCU is adaptively partitioned into coding units using quadtree. In each image unit (i.e., MB or leaf CU), DF is performed on the basis of 8×8 blocks for the luma component (4×4 blocks for the chroma component) and deblocking filter is applied across 8×8 luma block boundaries (4×4 block boundaries for the chroma component) according to boundary strength. In the following discussion, the luma component is used as an example for loop filter processing. However, it is understood that the loop processing is applicable to the chroma component as well. For each 8×8 block, horizontal filtering across vertical block boundaries is applied first, and then vertical filtering across horizontal block boundaries is applied. During processing of a luma block boundary, four pixels of each side are involved in filter parameter derivation, and up to three pixels on each side can be changed after filtering. For horizontal filtering across vertical block boundaries, pre-in-loop video data (i.e., unfiltered reconstructed video data or pre-DF video data in this case) is used for filter parameter derivation and also used as source video data for filtering. For vertical filtering across horizontal block boundaries, pre-in-loop video data (i.e., unfiltered reconstructed video data or pre-DF video data in this case) is used for filter parameter derivation, and DF intermediate pixels (i.e. pixels after horizontal filtering) are used for filtering. For DF processing of a chroma block boundary, two pixels of each side are involved in filter parameter derivation, and at most one pixel on each side is changed after filtering. For horizontal filtering across vertical block boundaries, unfiltered reconstructed pixels are used for filter parameter derivation and as source pixels for filtering. For vertical filtering across horizontal block boundaries, DF processed intermediate pixels (i.e. pixels after horizontal filtering) are used for filter parameter derivation and also are used as source pixel for filtering.

The DF process can be applied to the blocks of a picture. In addition, DF process may also be applied to each image unit (e.g., MB or LCU) of a picture. In the image-unit based DF process, the DF process at the image unit boundaries depends on data from neighboring image units. The image units in a picture are usually processed in a raster scan order. Therefore, data from an upper or left image unit is available for DF processing on the upper side and left side of the image unit boundaries. However, for the bottom or right side of the image unit boundaries, the DF processing has to be delayed until the corresponding data becomes available. The data dependency issue associated with DF complicates system design and increase system cost due to data buffering of neighboring image units.

In a system with subsequent adaptive filters, such as SAO and ALF that operate on data processed by in-loop filter (e.g., DF), the additional adaptive filter processing further complicates system design and increases system cost/latency. For example, in HEVC Test Model Version 4.0 (HM-4.0), SAO and ALF are applied adaptively, which allow SAO parameters and ALF parameters to be adaptively determined for each picture ("WD4: Working Draft 4 of High-Efficiency Video Coding", Bross et. al., Joint Collaborative Team on Video Coding (JCT-VC) of ITU-T SG16 WP3 and ISO/IEC JTC1/SC29/WG11, 6th Meeting: Torino, IT, 14-22 Jul. 2011, Document: JCTVC-F803). During SAO processing of a picture, SAO parameters of the picture are derived based on DF output pixels and the original pixels of the picture, and then SAO processing is applied to the DF-processed picture with the derived SAO parameters. Similarly, during the ALF processing of a picture, ALF parameters of the picture are derived based on SAO output pixels and the original pixels of the picture, and then the ALF processing is applied to the SAO-processed picture with the derived ALF parameters. The picture-based SAO and ALF processing require frame buffers to store a DF-processed frame and an SAO-processed frame. Such systems will incur higher system cost due to the additional frame buffer requirement and also suffer long encoding latency.

FIG. 3 illustrates a system block diagram corresponding to an encoder based on the sequential SAO and ALF processes at an encoder side. Before SAO 320 is applied, the SAO parameters have to be derived as shown in block 310. The SAO parameters are derived based on DF-processed data. After SAO is applied to DF-processed data, the SAO-processed data is used to derive the ALF parameters as shown in block 330. Upon the determination of the ALF parameters, ALF is applied to the SAO-processed data as shown in block 340. As mentioned before, frame buffers are required to store DF output pixels for the subsequent SAO processing since the SAO parameters are derived based on a whole frame of DF-processed video data. Similarly, frame buffers are also required to store SAO output pixels for subsequent ALF processing. These buffers are not shown explicitly in FIG. 3. In more recent HEVC development, LCU-based SAO and ALF are used to reduce the buffer requirement as well as to reduce encoder latency. Nevertheless, the same processing flow as shown in FIG. 3 is used for LCU-based loop processing. In other words, the SAO parameters are determined from DF output pixels and the ALF parameters are determined from SAO output pixels on an LCU by LCU basis. As discussed earlier, the DF processing for a current LCU cannot be completed until required data from neighboring LCUs (the LCU below and the LCU to the right) becomes available. Therefore, the SAO processing for a current LCU will be delayed by about one picture-row worth of LCUs and a corresponding buffer is needed to store the one picture-row worth of LCUs. There is a similar issue for the ALF processing.

For LCU-based processing, the compressed video bitstream is structured to ease decoding process as shown in FIG. 4 according to HM-5.0. The bitstream 400 corresponds to compressed video data of one picture region, which may be a whole picture or a slice. The bitstream 400 is structured to include a frame header 410 (or a slice header if slice structure is used) for the corresponding picture followed by compressed data for individual LCUs in the picture. Each LCU data comprises an LCU header 410 and LCU residual data. The LCU header is located at the beginning of each LCU bitstream and contains information common to the LCU such as SAO parameters and ALF control information. Therefore, a decoder can be properly configured according to information embedded in the LCU header before decoding of the LCU residues starts, which can reduce the buffering requirement at the decoder side. However, it is a burden for an encoder to generate a bitstream compliant with the bitstream structure of FIG. 4 since the LCU residues may have to be buffered until the header information to be incorporated in the LCU header is ready.

As shown in FIG. 4, the LCU header is inserted in front of the LCU residual data. The SAO parameters for the LCU are included in the LCU header. The SAO parameters for the LCU are derived based on the DP-processed pixels of the LCU. Therefore, the DP-processed pixels of the whole LCU have to be buffered before the SAO processing can be applied to the DF-processed data. Furthermore, the SAO parameters include SAO filter On/Off decision regarding whether SAO is applied to the current LCU. The SAO filter On/Off decision is derived based on the original pixel data for the current LCU and the DF-processed pixel data. Therefore, the original pixel data for the current LCU also has to be buffered. When an On decision is selected for the LCU, the SAO filter type, i.e., either Edge Offset (EO) or Band Offset (BO), will be further determined. For the selected SAO filter type, the corresponding EO or BO parameters will be determined. The On/Off decision, EO/BO decision, and corresponding EO/BO parameters are embedded in the LCU header as described in HM-5.0. At the decoder side, SAO parameter derivation is not required since the SAO parameters are incorporated in the bitstream. The situation for ALF process is similar to SAO process. However, while SAO process is based on the DP-processed pixels, ALF process is based on the SAO-processed pixels.

As mention previously, DF process is deterministic, where the operations rely on underlying reconstructed pixels and information already available. No additional information needs to be derived by the encoder and incorporated in the bitstream. Therefore, in a video coding system without adaptive filters such as SAO and ALF, the encoder processing pipeline can be relatively straightforward. FIG. 5 illustrates an exemplary processing pipeline associated with key processing steps for an encoder. Inter/Intra Prediction block 510 represents the motion estimation/motion compensation for inter prediction and intra prediction corresponding to ME/MC 112 and Intra Pred. 110 of FIG. 1 respectively. Reconstruction 520 is responsible to form reconstructed pixels, which corresponds to T 118, Q 120, IQ 124, IT 126 and REC 128 of FIG. 1. Inter/Intra Prediction 510 is performed on each LCU to generate the residues first and Reconstruction 520 is then applied to the residues to form reconstructed pixels. The Inter/Intra Prediction 510 block and the Reconstruction 520 block are performed sequentially. However, Entropy Coding 530 and Deblocking 540 can be performed in parallel since there is no data dependency between Entropy Coding 530 and Deblocking 540. FIG. 5 is intended to illustrate an exemplary encoder pipeline to implement a coding system without adaptive filter processing. The processing blocks for the encoder pipeline may be configured differently.

When adaptive filter processing is used, the processing pipeline needs to be configured carefully. FIG. 6A illustrates an exemplary processing pipeline associated with key processing steps for an encoder with SAO 610. As mentioned before, SAO operates on DF-processed pixels. Therefore, SAO 610 is performed after Deblocking 540. Since SAO parameters will be incorporated in the LCU header, Entropy Coding 530 needs to wait until the SAO parameters are derived. Accordingly, Entropy Coding 530 shown in FIG. 6A starts after the SAO parameters are derived. FIG. 6B illustrates alternative pipeline architecture for an encoder with SAO, where Entropy Coding 530 starts at the end of SAO 610. The LCU size can be as large as 64×64 pixels. When an additional delay occurs in the pipeline stage, an LCU data needs to be buffered. The buffer size may be quite large. Therefore, it is desirable to shorten the delay in the processing pipeline.

FIG. 7A illustrates an exemplary processing pipeline associated with key processing steps for an encoder with SAO 610 and ALF 710. As mentioned before, ALF operates on SAO-processed pixels. Therefore, ALF 710 is performed after SAO 610. Since ALF control information will be incorporated in the LCU header, Entropy Coding 530 needs to wait until the ALF control information are derived. Accordingly, Entropy Coding 530 shown in FIG. 7A starts after the ALF control information are derived. FIG. 7B illustrates alternative pipeline architecture for an encoder with SAO and ALF, where Entropy Coding 530 starts at the end of ALF 710.

As shown in FIGS. 6A-B and FIGS. 7A-B, a system with adaptive filter processing will result in longer processing latency due to sequential process nature of the adaptive filter processing. It is desirable to develop a method and apparatus that can reduce processing latency and buffer size associated with adaptive filter processing.

While the in-loop filters can significantly enhance picture quality, the associated processing requires multi-pass access to picture-level data at the encoding side in order to perform parameter generation and filter operation. FIG. 8 illustrates an exemplary HEVC encoder incorporating deblocking, SAO and ALF. The encoder in FIG. 8 is based on the HEVC encoder of FIG. 1. However, the SAO parameter derivation 831 and ALF parameter derivation 832 are shown explicitly. SAO parameter derivation 831 needs to access original video data and DF processed data to generate SAO parameters. SAO 131 then operates on DF processed data based on the SAO parameters derived. Similarly, the ALF parameter derivation 832 needs to access original video data and SAO processed data to generate ALF parameters. ALF 132 then operates on SAO processed data based on the ALF parameters derived. If on-chip buffers (e.g. SRAM) are used for picture-level multi-pass encoding, the chip area will be very large. Therefore, off-chip frame buffers (e.g. DRAM) are used to store the pictures. The external memory bandwidth and power consumption will be increased substantially. Accordingly, it is desirable to develop a scheme that can relieve the high memory access requirement.

SUMMARY

A method and apparatus for loop processing of reconstructed video in an encoder system are disclosed. The loop processing comprises an in-loop filter and one or more adaptive filters. In one embodiment of the present invention, adaptive filter processing is applied to in-loop processed video data. The filter parameters for the adaptive filter are derived from the pre-in-loop video data so that the adaptive filter processing can be applied to the in-loop processed video data as soon as sufficient in-loop processed data becomes available for the subsequent adaptive filter processing. The coding system can be either picture-based or image-unit-based processing. The in-loop processing and the adaptive filter processing can be applied concurrently to a portion of picture for a picture-based system. For an image-unit-based system, the adaptive filter processing can be applied concurrently with the in-loop filter to a portion of the image-unit. In yet another embodiment of the present invention, two adaptive filters derive their respective adaptive filter parameters based on the same pre-in-loop video data. The image unit can be a largest coding unit (LCU) or a macroblock (MB). The filter parameters may also depends on partial in-loop filter processed video data.

In another embodiment, a moving window is used for image-unit-based coding system incorporating in-loop filter and one or more adaptive filters. First adaptive filter parameters of a first adaptive filter for an image unit are estimated based on the original video data and pre-in-loop video data of the image unit. The pre-in-loop video data is then processed utilizing the in-loop filter and the first adaptive filter on a moving window comprising one or more sub-regions from corresponding one or more image units of a current picture. The in-loop filter and the first adaptive filter can either be applied concurrently for at least one portion of a current moving window, or the first adaptive filter is applied to a second moving window and the in-loop filter is applied to a first moving window, wherein the second moving window is delayed from the first moving window by one or more moving windows. The in-loop filter is applied to the pre-in-loop video data to generate first processed data and the first adaptive filter is applied to the first processed data using the first adaptive filter parameters estimated based to generate second processed video data. The first filter parameters may also depend on partial in-loop filter processed video data. The method may further comprises estimating second adaptive filter parameters of a second adaptive filter for the image unit based on the original video data and the pre-in-loop video data of the image unit and processing the moving window utilizing the second adaptive filter on the moving window. Said estimating the second adaptive filter parameters of the second adaptive filter may also depend on partial in-loop filter processed video data.

In yet another embodiment, a moving window is used for image-unit-based decoding system incorporating in-loop filter and one or more adaptive filters. The pre-in-loop video data is processed utilizing the in-loop filter and the first adaptive filter on a moving window comprising one or more sub-regions from the corresponding one or more image units of a current picture. The in-loop filter is applied to the pre-in-loop video data to generate the first processed data and the first adaptive filter is applied to the first processed data using the first adaptive filter parameters incorporated in the video bitstream to generate the second processed video data. In one embodiment, the in-loop filter and the first adaptive filter can either be applied concurrently for at least one portion of a current moving window, or the first adaptive filter is applied to a second moving window and the in-loop filter is applied to a first moving window, wherein the second moving window is delayed from the first moving window by one or more moving windows.

DETAILED DESCRIPTION

Figure 1:
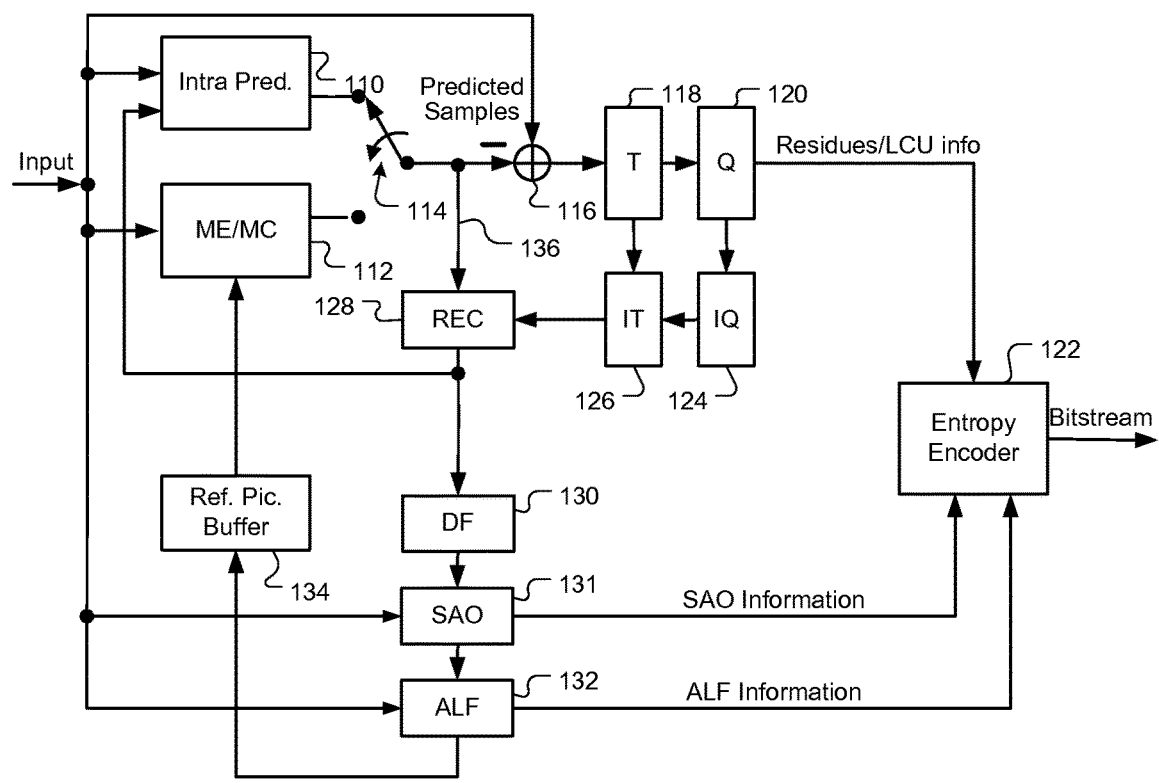
FIG. 1 illustrates an exemplary HEVC video encoding system incorporating DF, SAO and ALF loop processing.
Figure 2:
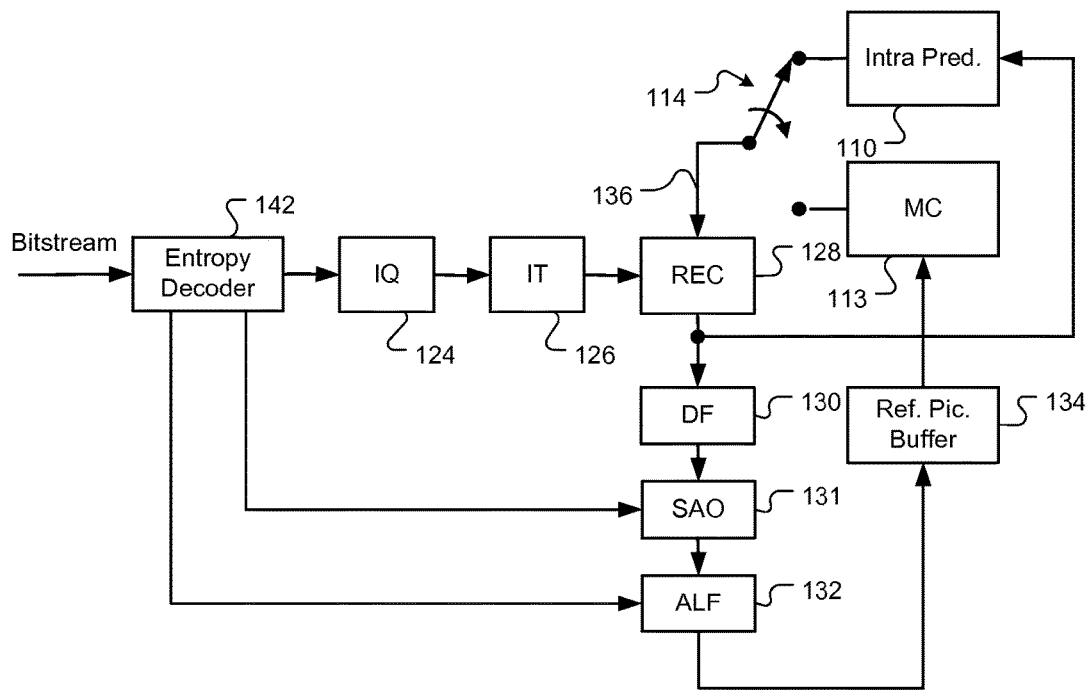
FIG. 2 illustrates an exemplary inter/intra video decoding system incorporating DF, SAO and ALF loop processing.
Figure 3:
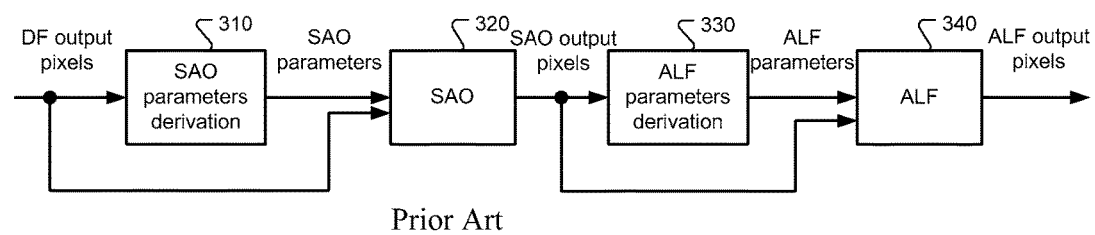
FIG. 3 illustrates a block diagram for a conventional video encoder incorporating pipelined SAO and ALF processing.
Figure 4:
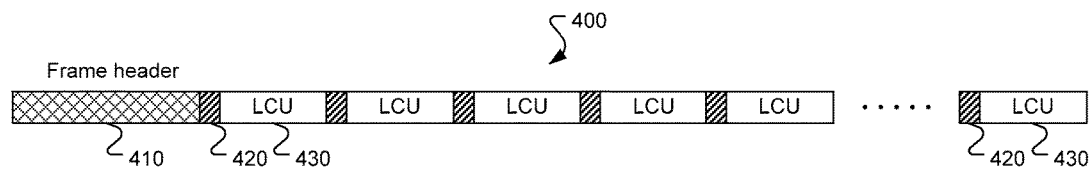
FIG. 4 illustrates an exemplary LCU-based video bitstream structure, where an LCU header is inserted at the beginning of each LCU bitstream.
Figure 5:
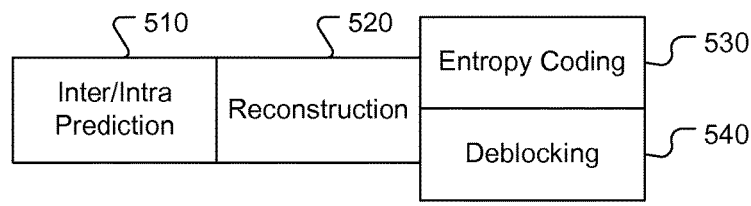
FIG. 5 illustrates an exemplary processing pipeline flow for an encoder incorporating Deblocking as an in-loop filter.
Figure 6A:
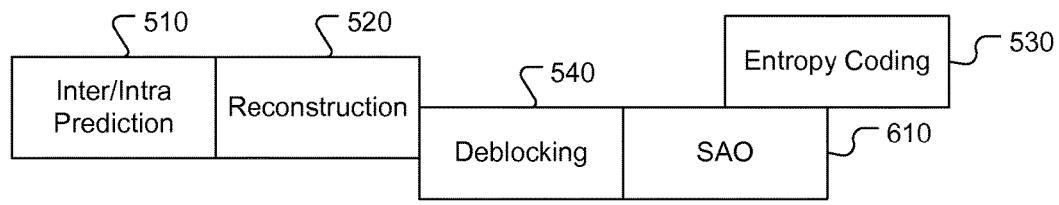
FIG. 6A illustrates an exemplary processing pipeline flow for an encoder incorporating Deblocking as an in-loop filter and SAO as an adaptive filter.
Figure 6B:
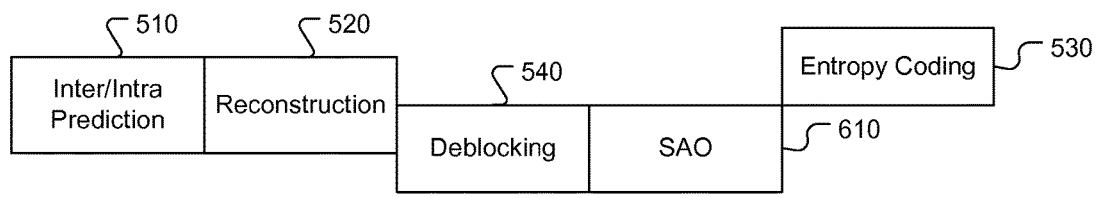
FIG. 6B illustrates an alternative processing pipeline flow for an encoder incorporating Deblocking as an in-loop filter and SAO as an adaptive filter.
Figure 7A:
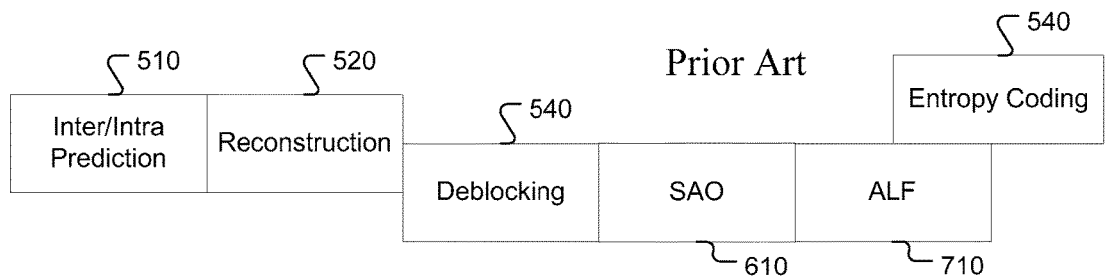
FIG. 7A illustrates an exemplary processing pipeline flow for a conventional encoder incorporating Deblocking as an in-loop filter, and SAO and ALF as adaptive filters.
Figure 7B:
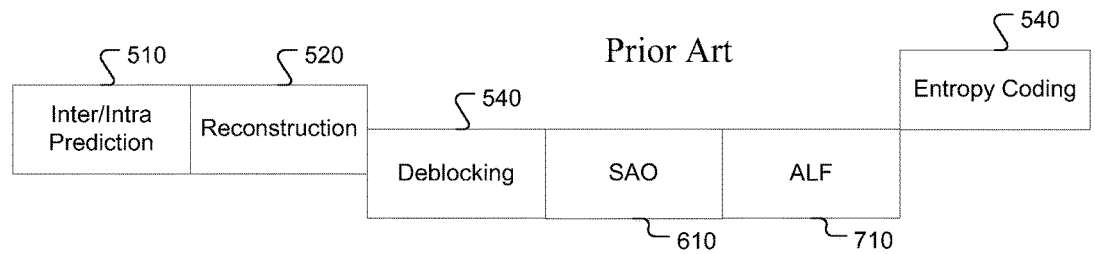
FIG. 7B illustrates an alternative processing pipeline flow for a conventional encoder incorporating Deblocking as an in-loop filter, and SAO and ALF as adaptive filters.
Figure 8:
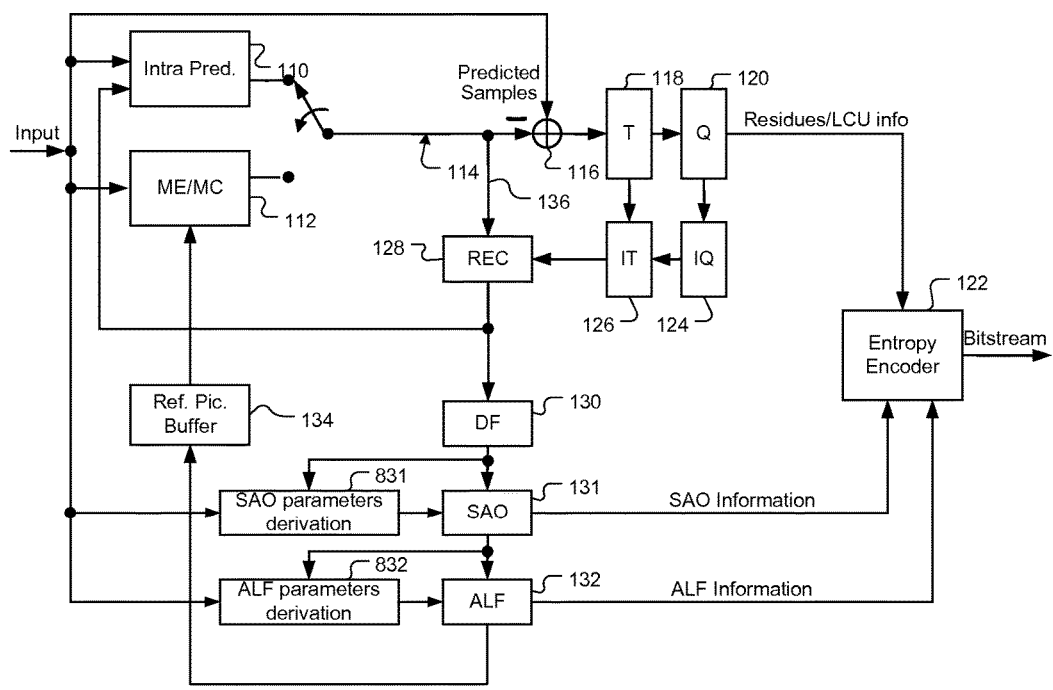
FIG. 8 illustrates an exemplary HEVC video encoding system incorporating DF, SAO and ALF loop processing, where SAO and ALF parameter derivation are shown explicitly.

As mentioned before, various types of loop processing are applied to reconstructed video data sequentially in a video encoder or decoder. For example, in HEVC, the DF processing is applied first; the SAO processing follows DF; and the ALF processing follows SAO as shown in FIG. 1. Furthermore, the respective filter parameter sets for the adaptive filters (i.e., SAO and ALF in this case) are derived based on the processed output of the previous-stage loop processing. For example, the SAO parameters are derived based on DF-processed pixels and ALF parameters are derived based on SAO-processed pixels. In an image-unit-based coding system, the adaptive filter parameter derivation is based on processed pixels for a whole image unit. Therefore, a subsequent adaptive filter processing cannot start until the previous-stage loop processing for an image unit is completed. In other words, the DF-processed pixels for an image unit have to be buffered for the subsequent SAO processing and the SAO-processed pixels for an image unit have to be buffered for the subsequent ALF processing. The size of an image unit can be as large as 64×64 pixels and the buffers could be sizeable. Furthermore, the above system also causes processing delay from one stage to the next and increases overall processing latency.

Figure 9:
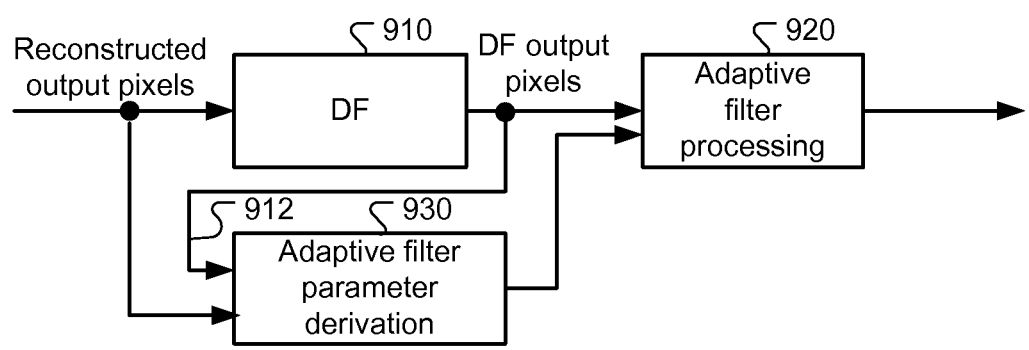
FIG. 9 illustrates an exemplary block diagram for an encoder with DF and adaptive filter processing according to an embodiment of the present invention.

An embodiment of the present invention can alleviate the buffer size requirement and reduce the processing latency. In one embodiment, the adaptive filter parameter derivation is based on reconstructed pixels instead of the DF-processed data. In other words, the adaptive filter parameter derivation is based on video data prior to the previous-stage loop processing. FIG. 9 illustrates an exemplary processing flow for an encoder embodying the present invention. The adaptive filter parameter derivation 930 is based on reconstructed data instead of the DF-processed data. Therefore, adaptive filter processing 920 can start whenever enough DF-processed data becomes available without the need of waiting for the completion of DF processing 910 for the current image unit. Accordingly, there is no need to store DF-processed data of an entire image unit for the subsequent adaptive filter processing 920. The adaptive filter processing may be either the SAO processing or the ALF processing. The adaptive filter parameter derivation 930 may also depend on partial output 912 from the DF processing 910. For example, the output from the DF processing 910 corresponding to first few blocks, in addition to the reconstructed video data, can be included in the adaptive filter parameter derivation 930. Since only partial output from DF processing 910 is used, the subsequent adaptive filter processing 920 can start before the DF processing 910 is completed.

Figure 10A:
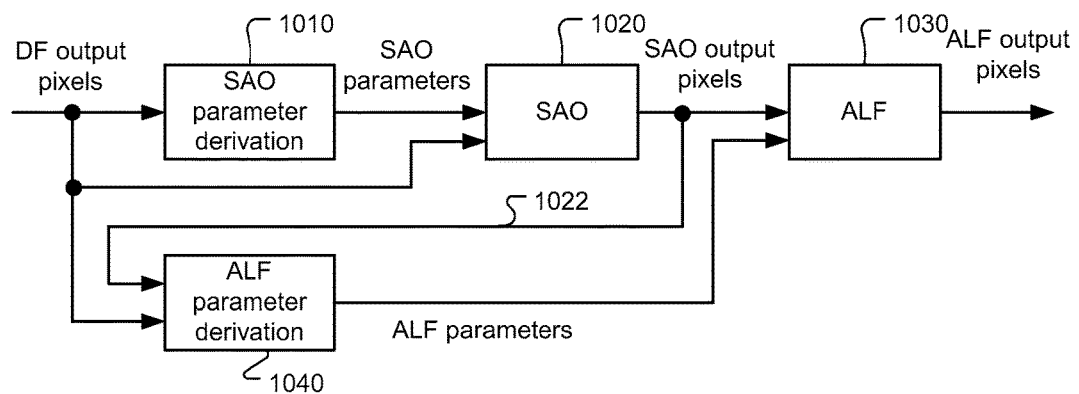
FIG. 10A illustrates an exemplary block diagram for an encoder with DF, SAO and ALF according to an embodiment of the present invention.

In another embodiment, adaptive filter parameter derivations for two or more types of adaptive filter processing are based on the same source. For example, instead of using SAO-processed pixels, the ALF parameter derivation may be based on DF-processed data, which is the same source data as the SAO parameter derivation. Therefore, the ALF parameters can be derived without the need to wait for the completion of SAO-processing of a current image unit. In fact, derivation of ALF parameters may be completed before the SAO processing starts or within a short period after the SAO processing starts. And, the ALF processing can start whenever sufficient SAO-processed data becomes available without the need of waiting for the SAO processing to complete for the image unit. FIG. 10A illustrates an exemplary system configuration incorporating an embodiment of the present invention, where both SAO parameter derivation 1010 and ALF parameter derivation 1040 are based on the same source data, i.e., DF-processed pixels in this case. The derived parameters are then provided to the respective SAO 1020 and ALF 1030 processings. The system of FIG. 10A relieves the requirement to buffer SAO processed pixels for an entire image unit since the subsequent ALF processing can start whenever sufficient SAO-processed data becomes available for the ALF processing to operate. The ALF parameter derivation 1040 may also depend on partial output 1022 from SAO 1020. For example, the output from SAO 1020 corresponding to first few lines or blocks, in addition to the DF output data, can be included in the ALF parameter derivation 1040. Since only partial output from SAO is used, the subsequent ALF 1030 can start before SAO 1020 is completed.

Figure 10B:
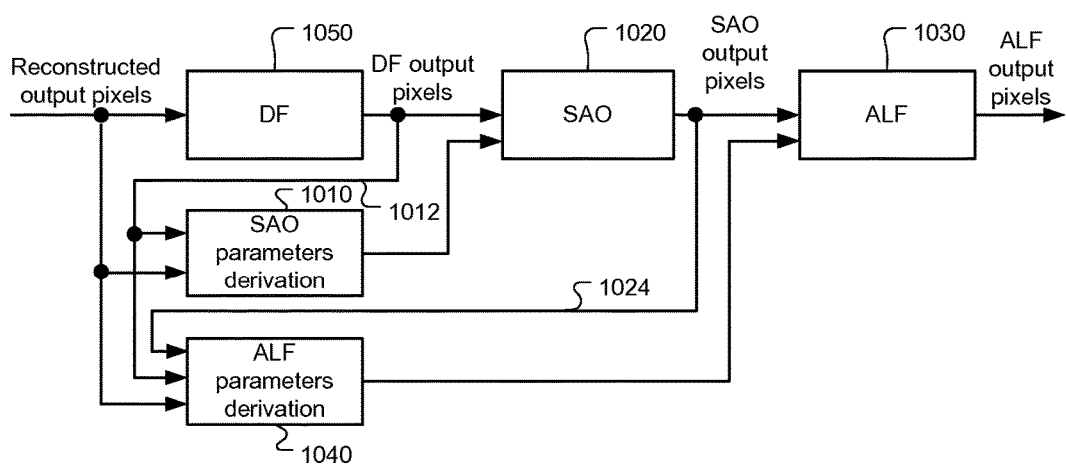
FIG. 10B illustrates an alternative block diagram for an encoder with DF, SAO and ALF according to an embodiment of the present invention.

In another example, both SAO and ALF parameter derivations are further moved toward previous stages as shown in FIG. 10B. Instead of using DF-processed pixels, both the SAO parameter derivation and the ALF parameter derivation are based on pre-DF data, i.e., the reconstructed data. Furthermore, the SAO and ALF parameter derivations can be performed in parallel. The SAO parameters can be derived without the need of waiting for completion of the DF-processing of a current image unit. In fact, derivation of SAO parameters may be completed before the DF processing starts or within a short period after the DF processing starts. And, the SAO processing can start whenever sufficient DF-processed data becomes available without the need of waiting for the DF processing to complete for the image unit. Similarly, the ALF processing can start whenever sufficient SAO-processed data becomes available without the need of waiting for the SAO processing to complete for the image unit. The SAO parameter derivation 1010 may also depend on partial output 1012 from DF 1050. For example, the output from DF 1050 corresponding to first few blocks, in addition to the reconstructed output data, can be included in the SAO parameter derivation 1010. Since only partial output from DF 1050 is used, the subsequent SAO 1020 can start before DF 1050 is completed. Similarly, the ALF parameter derivation 1040 may also depend on partial output 1012 from DF 1050 and partial output 1024 from SAO 1020. Since only partial output from SAO 1020 is used, the subsequent ALF 1030 can start before SAO 1020 is completed. While the system configuration as shown in FIG. 10A and FIG. 10B can reduce buffer requirement and processing latency, the derived SAO and ALF parameters may not be optimal in terms of PSNR.

Figure 11A:
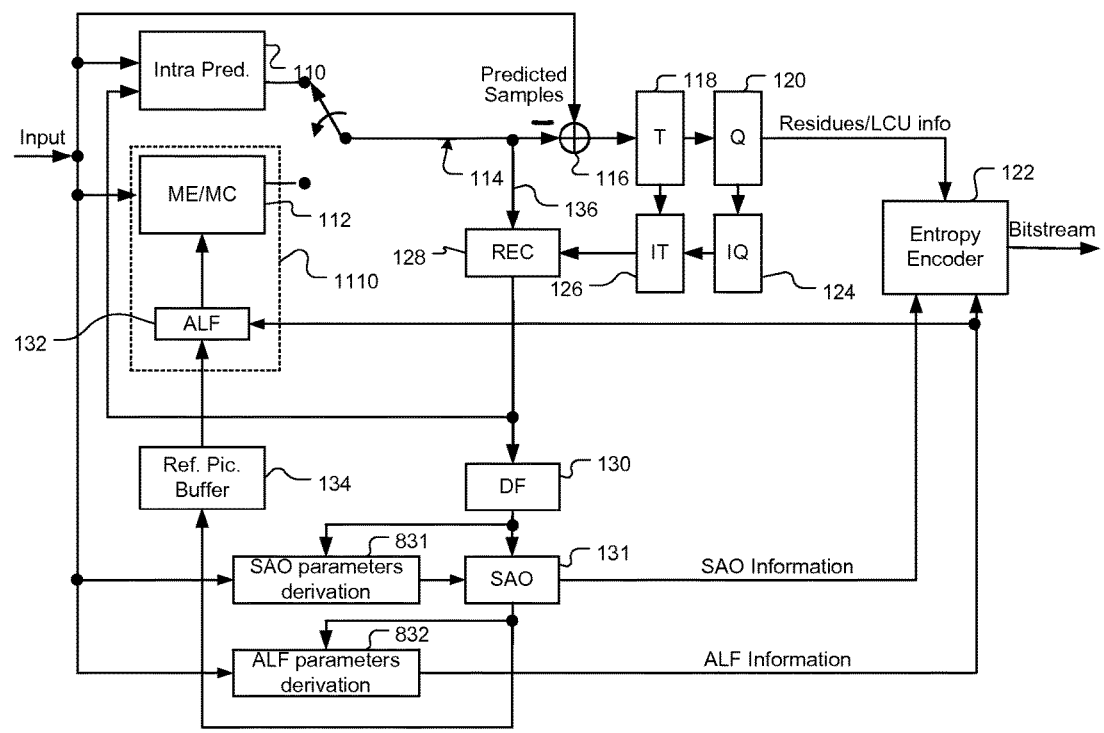
FIG. 11A illustrates an exemplary HEVC video encoding system incorporating shared memory access between Inter prediction and in-loop processing, where ME/MC shares memory access with ALF.
Figure 11B:
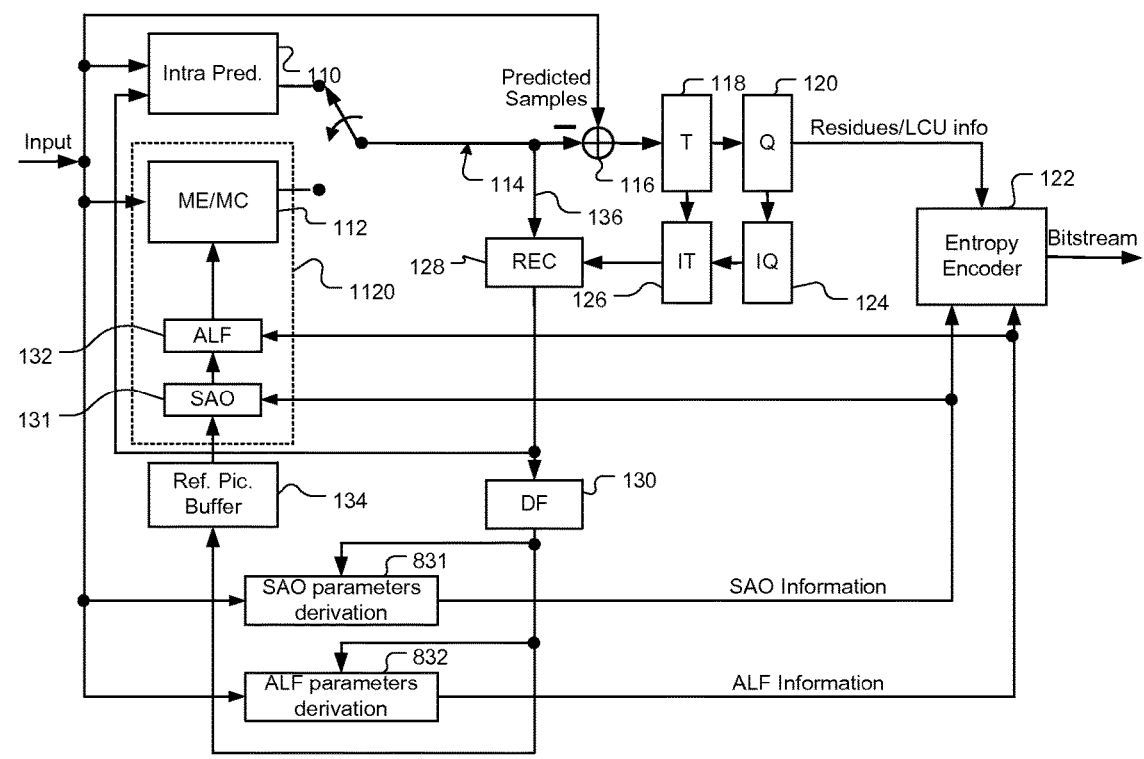
FIG. 11B illustrates an exemplary HEVC video encoding system incorporating shared memory access between Inter prediction and in-loop processing, where ME/MC shares memory access with ALF and SAO.

In order to reduce the DRAM bandwidth requirements of SAO or ALF, an embodiment according to the present invention combines the memory access for ALF filter processing with the memory access for Inter prediction stage of next picture encoding process as shown in FIG. 11A. Since Inter prediction needs to access the reference picture in order to perform motion estimation or motion compensation, the ALF filter process can be performed in this stage. Compared to the conventional ALF implementation, the combined processing 1110 for ME/M 112 and ALF 132 can reduce one additional read and one additional write of DRAM to generate parameters and apply filter processing. After the filter processing is applied, the modified reference data can be stored back to the reference picture buffer by replacing the un-filtered data for future usage. FIG. 11B illustrates another embodiment of combined Inter prediction with in-loop processing, where the in-loop processing includes both ALF and SAO to further reduce memory bandwidth requirement. Both SAO and ALF need to use DF output pixels as the input for the parameter derivation, as show in FIG. 11B. The embodiment according to FIG. 11B can reduce two additional reads from and two additional writes to external memory (e.g., DRAM) for parameter derivation and filter operations compared to the conventional in-loop processing. Moreover, the parameters of SAO and ALF can be generated in parallel as shown in FIG. 11B. In this case, the parameter derivation for ALF may not be optimized. Nevertheless, the coding loss associated with embodiments of the present invention may be justified in light of the substantial reduction in DRAM memory access.

Figure 11C:
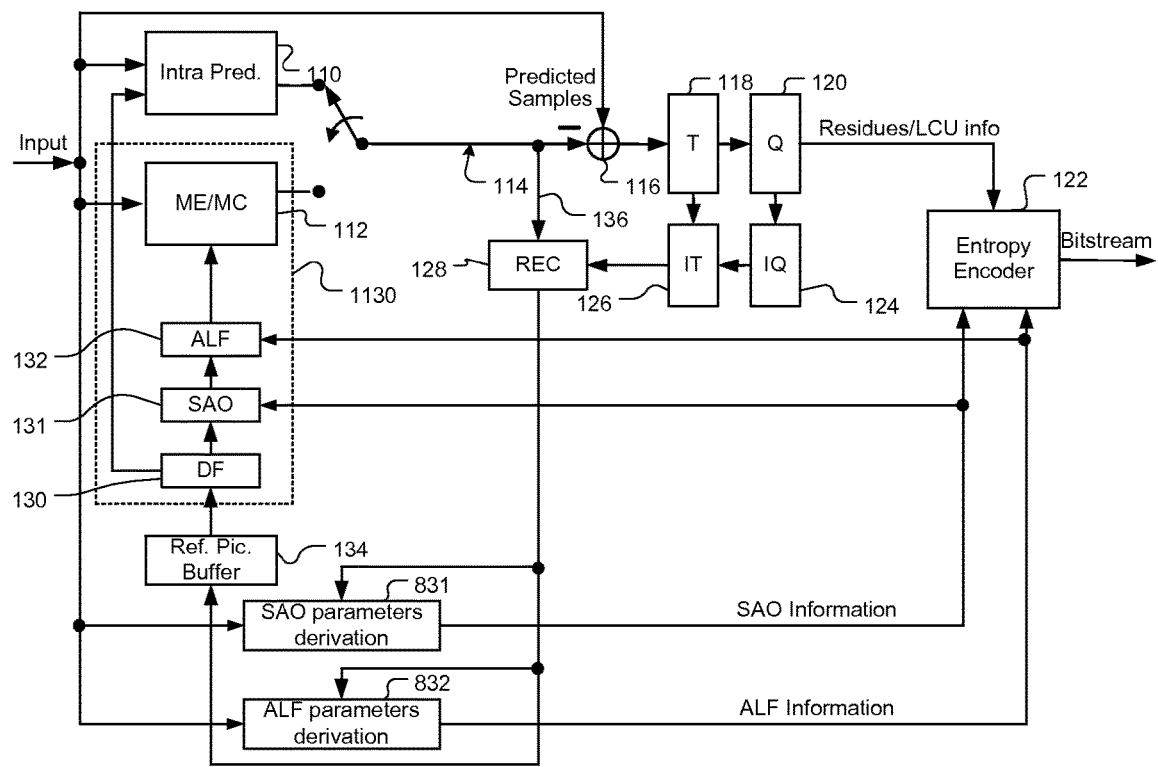
FIG. 11C illustrates an exemplary HEVC video encoding system incorporating shared memory access between Inter prediction and in-loop processing, where ME/MC shares memory access with ALF, SAO and DF.

In HM-4.0, there is no need of filter parameter derivation for DF. In yet another embodiment of the present invention, the line buffers of DF are shared with ME search range buffers, as shown in FIG. 11C. In this configuration, SAO and ALF use pre-DF pixels (i.e. reconstructed pixels) as the input for parameter derivation.

Figure 12A:
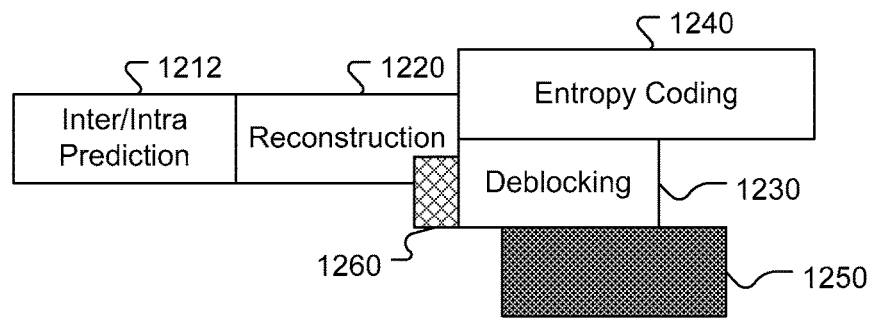
FIG. 12A illustrates an exemplary processing pipeline flow for an encoder with DF and one adaptive filter according to an embodiment of the present invention.
Figure 12B:
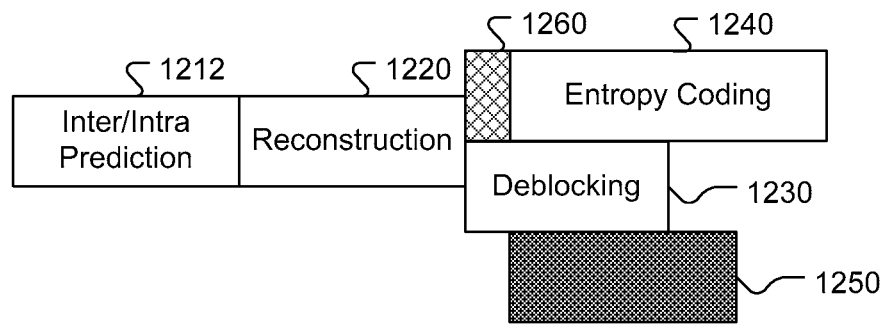
FIG. 12B illustrates an alternative processing pipeline flow for an encoder with DF and one adaptive filter according to an embodiment of the present invention.

FIG. 10A and FIG. 10B illustrate two examples of multiple adaptive filter parameter derivations based on the same source. In order to derive the adaptive filter parameters for two or more types of adaptive filter processing based on the same source, at least one set of the adaptive filter parameters are derived based on data before a previous-stage loop processing. While examples in FIG. 10A and FIG. 10B illustrate the processing flow aspect of the embodiments according to the present invention, examples in FIGS. 12A-B and FIGS. 13A-B illustrate the timing aspect of the embodiments according to the present invention. FIGS. 12A-B illustrates an exemplary time profile for an encoding system incorporating one type of adaptive filter processing, such as SAO or ALF. Intra/Inter Prediction 1210 is performed first and Reconstruction 1220 follows. As mentioned before, transformation, quantization, de-quantization and inverse transformation are implicitly included in Intra/Inter Prediction 1210 and/or Reconstruction 1220. Since the adaptive filter parameter derivation is based on the pre-DF data, the adaptive filter parameter derivation may start when reconstructed data becomes available. The adaptive filter parameter derivation can be completed as soon as the reconstruction for the current image unit is finished or shortly after.

In the exemplary processing pipeline flow in FIG. 12A, deblocking 1230 is performed after reconstruction is completed for the current image unit. Furthermore, the embodiment shown in FIG. 12A finishes adaptive filter parameter derivation before Deblocking 1230 and Entropy Coding 1240 start so that the adaptive filter parameters can be in time for Entropy Coding 1240 to incorporate in the header of the corresponding image unit bitstream. In the case of FIG. 12A, access to the reconstructed data for adaptive filter parameter derivation may take place when the reconstructed data is generated and before the data is written to the frame buffer. The corresponding adaptive filter processing (e.g., SAO or ALF) can start whenever sufficient in-loop processed data (i.e., DF-processed data in this case) becomes available without waiting for the completion of the in-loop filter processing on the image unit. The embodiment shown in FIG. 12B performs adaptive filter parameter derivation after Reconstruction 1220 is completed. In other words, adaptive filter parameter derivation is performed in parallel with Deblocking 1230. In the case of FIG. 12B, access to the reconstructed data for adaptive filter parameter derivation may occur when the reconstructed data is read back from the buffer for deblocking. When the adaptive filter parameters are derived, Entropy Coding 1240 can start to incorporate the adaptive filter parameters in the header of the corresponding image unit bitstream. As shown in FIG. 12A and FIG. 12B, the in-loop filter processing (i.e., Deblocking in this case) and the adaptive filter processing (i.e., SAO in this case) are performed concurrently for a portion of the image unit period. According to the embodiments in FIG. 12A and FIG. 12B, the in-loop filter can be applied to reconstructed video data in a first part of an image unit and the adaptive filter can be applied to the in-loop processed data in a second part of the image unit at the same time during the portion of the image unit period. Since the adaptive filter operation may depend on neighboring pixels of an underlying pixel, the adaptive filter operation may have to wait for enough in-loop processed data to become available. Accordingly, the second part of the image unit corresponds to delayed video data with respect to the first part of the image unit. When the in-loop filter is applied to reconstructed video data in a first part of the image unit and the adaptive filter is applied to the in-loop processed data in a second part of the image unit at the same time for a portion of the image unit period, the case is referred as that the adaptive filter and the adaptive filter are applied concurrently to a portion of the image unit. Depending on the filter characteristics of the in-loop filter processing and the adaptive filter processing, the concurrent processing may represent a large portion of the image unit.

The pipeline flow associated with concurrent in-loop filter and adaptive filter, as shown in FIG. 12A and FIG. 12B, can be applied to picture-based coding systems as well as image unit-based coding system. In the picture-based coding system, the subsequently adaptive filter processing can be applied to the DF-processed video data as soon as sufficient DF-processed video data becomes available. Therefore, there is no need to store a whole DF-processed picture between DF and SAO. In the image unit-based coding system, concurrent in-loop filter and adaptive filter can be applied to a portion of an image unit as mentioned before. However, in another embodiment of the present invention, two consecutive loop filters, such as DF and SAO processing, are applied to two image units that are apart by one or more image units. For example, while DF is applied to a current image unit, SAO is applied to a previously DF-processed image unit that is two image units apart from the current image unit.

Figure 13A:
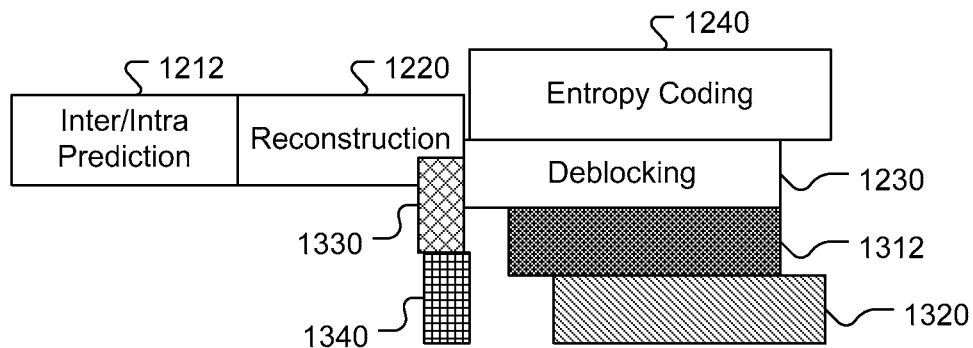
FIG. 13A illustrates an exemplary processing pipeline flow for an encoder with DF and two adaptive filters according to an embodiment of the present invention.
Figure 13B:
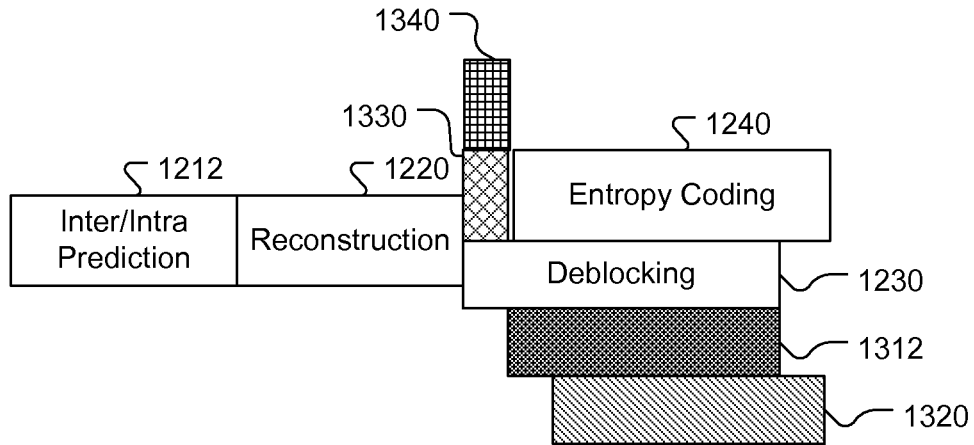
FIG. 13B illustrates an alternative processing pipeline flow for an encoder with DF and two adaptive filters according to an embodiment of the present invention.

FIGS. 13A-B illustrate an exemplary time profile for an encoding system incorporating both SAO and ALF. Intra/Inter Prediction 1210, Reconstruction 1220 and Deblocking 1230 are performed sequentially on an image unit basis. The embodiment shown in FIG. 13A performs both SAO parameter derivation 1330 and ALF parameter derivation 1340 before Deblocking 1230 starts since both the SAO parameters and the ALF parameters are derived based on the reconstructed data. Therefore, both SAO parameters and ALF parameter derivations can be performed in parallel. Entropy Coding 1240 can begin to incorporate the SAO parameters and ALF parameters in the header of the image unit data when the SAO parameters become available or when both the SAO parameters and the ALF parameters become available. FIG. 13A illustrates an example that both SAO and ALF parameter derivations are performed during Reconstruction 1220. As mentioned before, access to the reconstructed data for adaptive filter parameter derivation may occur when the reconstructed data is generated and before the data is written to the frame buffer. SAO and ALF parameter derivations may either begin at the same time or be staggered. The SAO processing 1310 can start whenever sufficient DF-processed data becomes available without the need of waiting for the completion of DF processing on the image unit. The ALF processing 1320 can start whenever sufficient SAO-processed data becomes available without the need of waiting for the completion of SAO processing on the image unit. The embodiment shown in FIG. 13B performs SAO parameter derivation 1330 and ALF parameter derivation 1340 after Reconstruction 1220 is completed. After both SAO and ALF parameter are derived, Entropy Coding 1240 can start to incorporate the parameters in the header of the corresponding image unit bitstream. In the case of FIG. 13B, access to the reconstructed data for adaptive filter parameter derivation may occur when the reconstructed data is read back from the buffer for deblocking. As shown in FIG. 13A and FIG. 13B, the in-loop filter processing (i.e., Deblocking in this case) and the multiple adaptive filter processing (i.e., SAO and ALF in this case) are performed concurrently for a portion of the image unit period. Depending on the filter characteristics of the in-loop filter processing and the adaptive filter processing, the concurrent processing may represent a large portion of the image unit period.

The pipeline flow associated with concurrent in-loop filter and one or more adaptive filters, as shown in FIG. 13A and FIG. 13B, can be applied to picture-based coding systems as well as image unit-based coding system. In the picture-based coding system, the subsequently adaptive filter processing can be applied to the DF-processed video data as soon as sufficient DF-processed video data becomes available. Therefore, there is no need to store a whole DF-processed picture between DF and SAO. Similarly, the ALF processing can start as soon as sufficient SAO-processed data becomes available and there is no need to store a whole SAO-processed picture between SAO and ALF. In the image unit-based coding system, concurrent in-loop filter and one or more adaptive filters can be applied to a portion of an image unit as mentioned before. However, in another embodiment of the present invention, two consecutive loop filters, such as DF and SAO processing or SAO and ALF processing, are applied to two image units that are apart by one or more image units. For example, while DF is applied to a current image unit, SAO is applied to a previously DF-processed image unit that is two image units apart from the current image unit.

FIGS. 12A-B and FIGS. 13A-B illustrate exemplary time profiles of adaptive filter parameter derivation and processing according to various embodiments of the present invention. These examples are not intended for exhaustive illustration of time profiles of the present invention. A person skilled in the art may re-arrange or modify the time profile to practice the present invention without departing from the spirit of the present invention.

Figure 14:
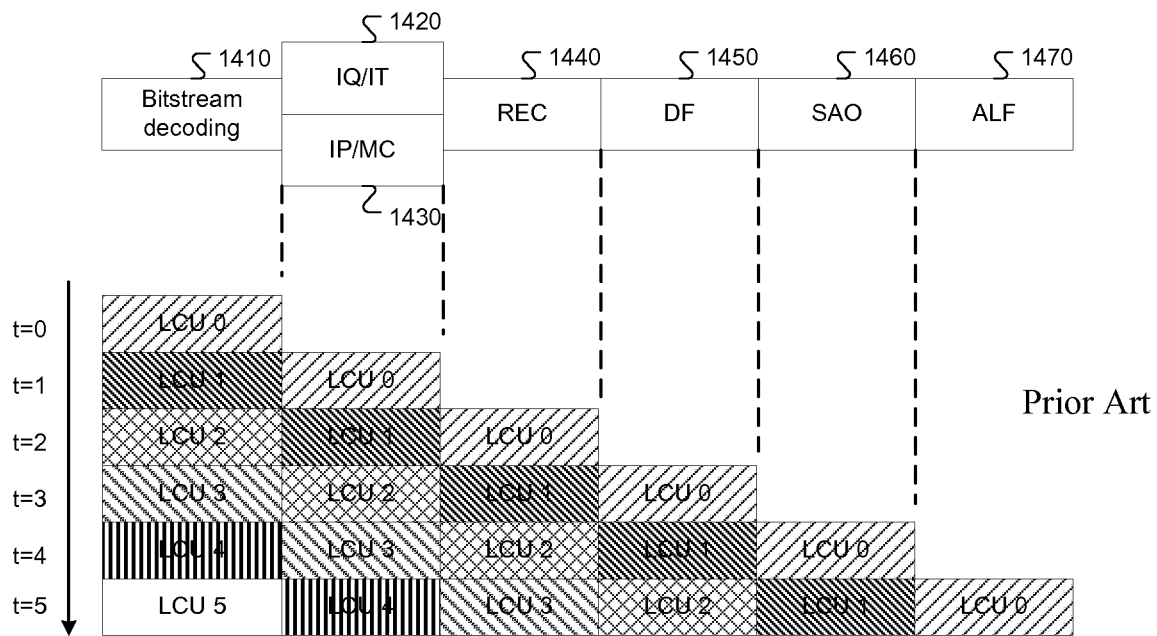
FIG. 14 illustrates a processing pipeline flow and buffer pipeline for a conventional LCU-based decoder with DF, SAO and ALF loop processing.

As mentioned before, in HEVC, image unit-based coding process is applied, where each image unit can use its own SAO and ALF parameters. The DF processing is applied across vertical and horizontal block boundaries. For the block boundaries aligned with image unit boundaries, the DF processing also relies on data from neighboring image units. Therefore, some pixels at or near the boundaries cannot be processed until the required pixels from neighboring image units become available. Both SAO and ALF processing also involve neighboring pixels around a pixel being processed. Therefore, when SAO and ALF are applied to the image unit boundaries, additional buffer may be required to accommodate data from neighboring image units. Accordingly, the encoder and decoder need to allocate a sizeable buffer to store the intermediate data during DF, SAO and ALF processing. The sizeable buffer inherently induces long encoding or decoding latency. FIG. 14 illustrates an example of decoding pipeline flow of a conventional HEVC decoder with DF, SAO and ALF loop processing for consecutive image units. The incoming bitstream is processed by Bitstream decoding 1410 which performs bitstream parsing and entropy decoding. The parsed and entropy decoded symbols then go through video decoding steps including de-quantization and inverse transform (IQ/IT 1420) and intra-prediction/motion compensation (IP/MC) 1430 to form reconstructed residues. The reconstruction block (REC 1440) then operates on the reconstructed residues and previously reconstructed video data to form reconstructed video data for a current image unit or block. Various loop processings including DF 1450, SAO 1460 and ALF 1470 are then applied to the reconstructed data sequentially. At the first image-unit time (t=0), image unit 0 is processed by Bitstream decoding 1410. At the next image unit time (t=1), image unit 0 moves to the next stage of the pipeline (i.e., IQ/IT 1420 and IP/MC 1430) and a new image unit (i.e., image unit 1) is processed by Bitstream decoding 1410. The processing continues and at t=5, image unit 0 reaches ALF 1470 while a new image unit (i.e., image unit 5) enters for Bitstream decoding 1410. As shown in FIG. 14, it takes 6 image unit periods for an image unit to be decoded, reconstructed and processed by various loop processings. It is desirable to reduce the decoding latency. Furthermore, between any two consecutive stages, there may be a buffer to store an image unit worth of video data.

Figure 15:
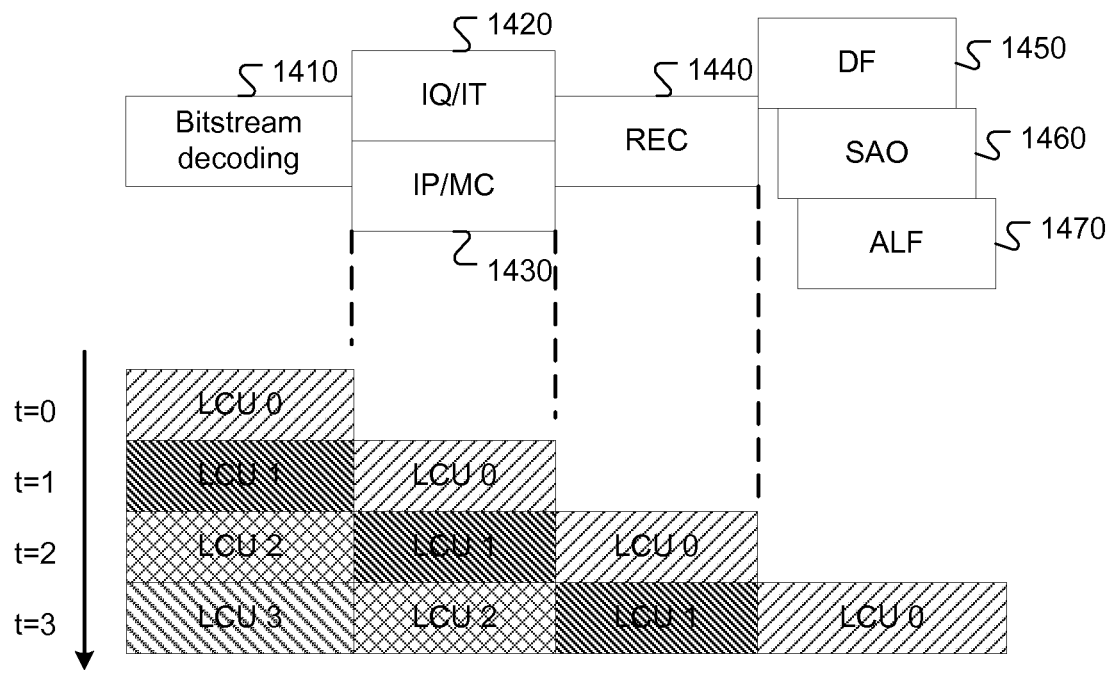
FIG. 15 illustrates exemplary processing pipeline flow and buffer pipeline for an LCU-based decoder with DF, SAO and ALF loop processing incorporating an embodiment of the present invention.

A decoder incorporating an embodiment according to the present invention can reduce the decoding latency. As described in FIG. 13A and FIG. 13B, the SAO and ALF parameters can be derived based on reconstructed data and the parameters become available at the end of reconstruction or shortly afterward. Therefore, SAO can start whenever enough DF-processed data is available. Similarly, ALF can start whenever enough SAO-processed data is available. FIG. 15 illustrates an example of decoding pipeline flow of a decoder incorporating an embodiment of the present invention. For the first three processing periods, the pipeline process is the same as the conventional decoder. However, the DF, SAO and ALF processings can starts in a staggered fashion and the processings are substantially overlapped among the three types of loop processing. In other words, the in-loop filter (i.e., DF in this case) and one or more adaptive filters (i.e., SAO and ALF in this case) are performed concurrently for a portion of the image unit data. Accordingly, the decoding latency is reduced compared to the conventional HEVC decoder.

Figure 16:
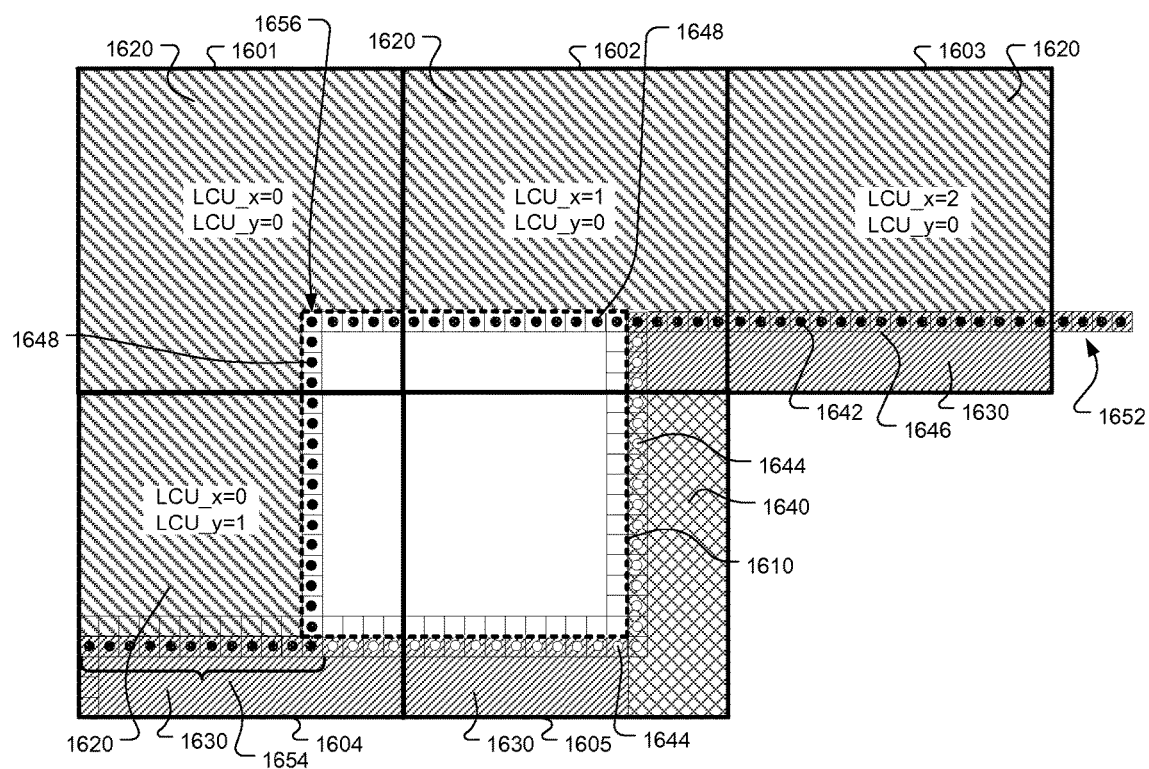
FIG. 16 illustrates an exemplary moving window for an LCU-based decoder with in-loop filter and adaptive filter according to an embodiment of the present invention.

The embodiment as shown in FIG. 15 helps to reduce decoding latency by allowing DF, SAO and ALF to be performed in a staggered fashion so that a subsequent processing does not need to wait for completion of a previous stage processing on an entire image unit. Nevertheless, the DF, SAO and ALF processings may rely on neighboring pixels which causes data dependency on neighboring image units for pixels around the image unit boundaries. FIG. 16 illustrates an exemplary decoding pipeline flow for an image unit-based decoder with DF and at least one adaptive filter processing according an embodiment of the present invention. Blocks 1601 through 1605 represent five image units, where each image unit consists of 16×16 pixels and each pixel is represented by a small square 1646. Image unit 1605 is the current image unit to be processed. Due to data dependency associated with DF across image unit boundaries, a sub-region of the current image unit and three sub-regions from previously processed neighboring image unit can be processed by DF. The window (also referred to as a moving window) is indicated by the thick dashed box 1610 and the four sub-regions correspond to the four white areas in image unit 1601, 1602, 1604 and 1605 respectively. The image units are processed according to the raster scan order, i.e., from image unit 1601 through image unit 1605. The window shown in FIG. 16 corresponds to pixels being processed in a time slot associated with image unit 1605. At this time, shaded areas 1620 have been fully DF processed. Shaded areas 1630 are processed by horizontal DF, but not processed by vertical DF yet. Shaded area 1640 in image unit 1605 is processed neither by horizontal DF nor by vertical DF.

FIG. 15 shows a coding system that allows DF, SAO and ALF to be performed concurrently for at least a portion of image unit so as to reduce buffer requirement and processing latency. The DF, SAO and ALF processings as illustrated in FIG. 15 can be applied to the system shown in FIG. 16. For the current window 1610, horizontal DF can be applied first and then vertical DF can be applied. The SAO operation requires neighboring pixels to derive filter type information. Therefore, an embodiment of the present invention stores information associated with pixels at right and bottom boundaries outside the moving window that is required for derivation of type information. The type information can be derived based on the edge sign (i.e., the sign of difference between an underlying pixel and a neighboring pixel inside the window). Storing the sign information is more compact than storing the pixel values. Accordingly, the sign information is derived for pixels at right and bottom boundaries within the window as indicated by white circles 1644 in FIG. 16. The sign information associated with pixels at the right and bottom boundaries within the current window will be stored for SAO processing of subsequent windows. On the other hand, when SAO is applied to pixels at left and top boundaries within the window, the boundary pixels outside the window had already been DF processed and cannot be used for type information derivation. However, the previously stored sign information related to the boundary pixels inside the window can be retrieved to derive type information. The pixel locations associated with the previously stored sign information for SAO processing of the current window are indicated by dark circles 1648 in FIG. 16. The system will store previously computed sign information for a row 1652 aligned with the top row of the current window, a row 1654 below the bottom of the current window and a column 1656 aligned with the leftmost row of the current window. After SAO processing is completed for the current window, the current window is moved to the right and the stored sign information can be updated. When the window reaches the picture boundary at the right side, the window moves down and starts from the picture boundary at the left side.

Figure 17A:
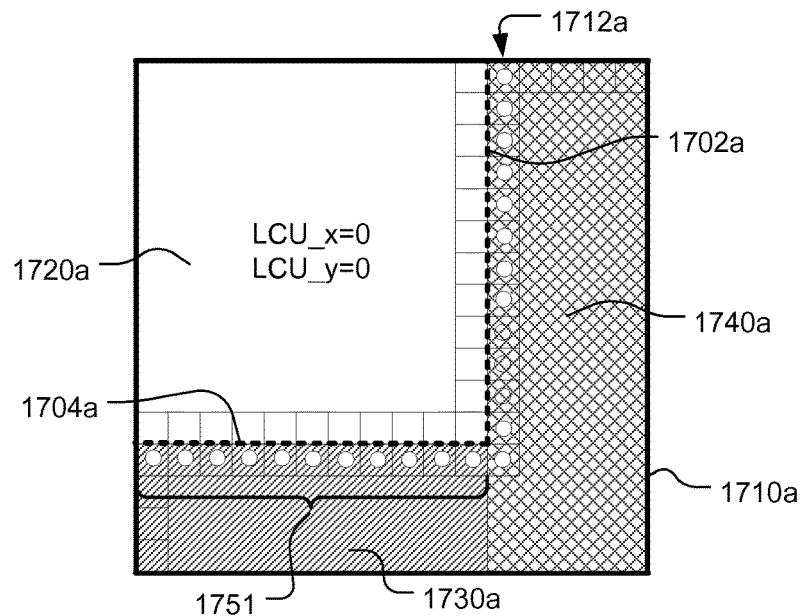
FIGS. 17A-C illustrate various stages of an exemplary moving window for an LCU-based decoder with in-loop filter and adaptive filter according to an embodiment of the present invention.
Figure 17B:
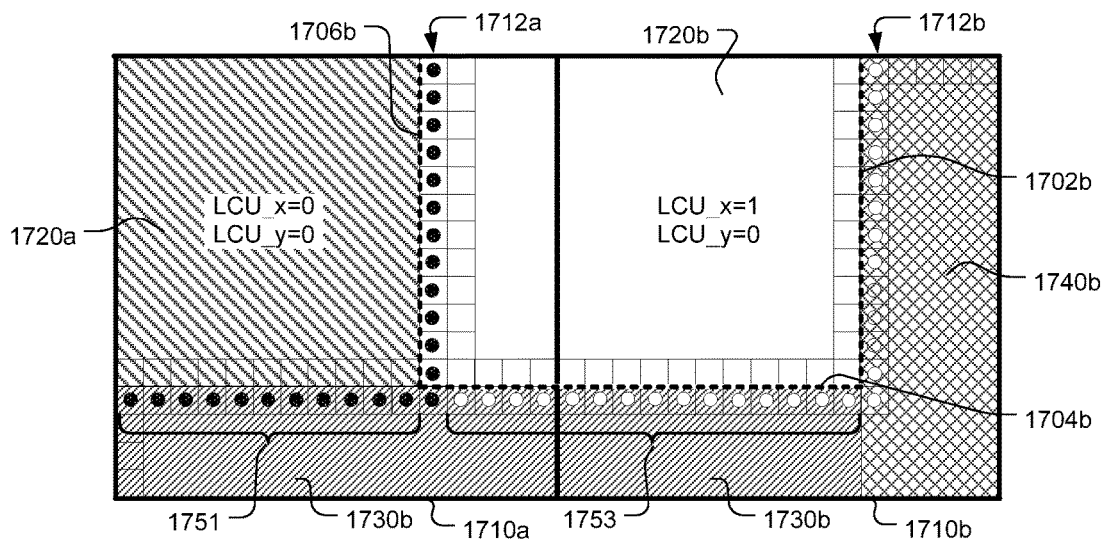
Figure 17C:
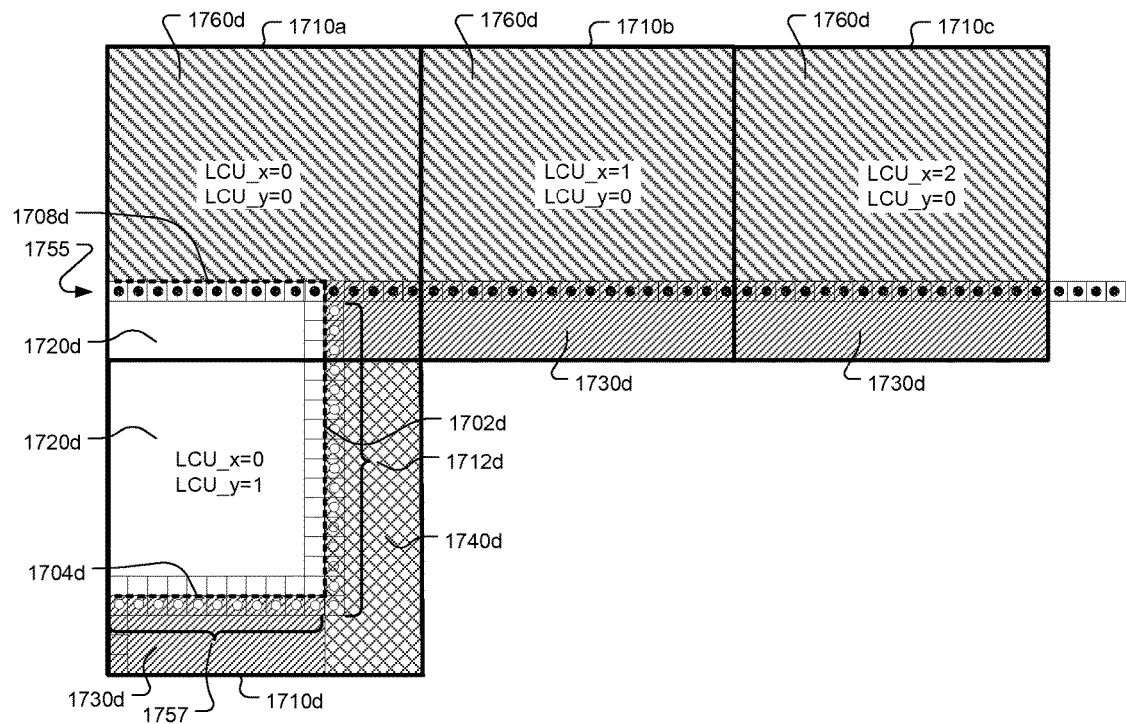

The current window 1610 shown in FIG. 16 covers pixels across four neighboring image units, i.e., LCUs 1601, 1602, 1604 and 1605. However, the window may cover only 1 or 2 LCUs. The processing window starts from a first LCU in the upper left corner of a picture and moves across the picture in a raster scan fashion. FIG. 17A-FIG. 17C illustrate an example of processing progression. FIG. 17A illustrates the processing window associated with the first LCU 1710a of a picture. LCU_x and LCU_y represent the LCU horizontal and vertical indices respectively. The current window is shown as the area with white background having right side boundary 1702a and bottom boundary 1704a. The top and left window boundaries are bounded by the picture boundaries. A 16×16 LCU size is used as an example and each square corresponds to a pixel in FIG. 17A. The full DF processing (i.e., horizontal DF and vertical DF) can be applied to pixels within the window 1720a (i.e., the area with white background). For area 1730a, the horizontal DF can be applied but vertical DF processing cannot be applied yet since the boundary pixels from the LCU below are not available. For area 1740a, horizontal DF processing cannot be applied since the boundary pixels from the right LCU are not available yet. Consequently, the subsequent vertical DF processing cannot be applied to area 1740a either. For pixels within the window 1720a, SAO processing can be applied after the DF processing. As mentioned before, the sign information associated with pixel row 1751 below the window bottom boundary 1704a and pixel column 1712a outside the right window boundary 1702a is calculated and stored for deriving type information for SAO processing of subsequent LCUs. The pixel locations where the sign information is calculated and stored are indicated by white circles. In FIG. 17A, the window consists of one sub-region (i.e., area 1720a).

FIG. 17B illustrates the processing pipeline flow for the next window, where the window covers pixels across two LCUs 1710a and 1710b. The processing pipeline flow for LCU 1710b is the same as LCU 1710a at the previous window period. The current window is enclosed by window boundaries 1702b, 1704b and 1706b. The pixels within the current window 1720b cover pixels from both LCUs 1710a and 1710b as indicated by the area with white background in FIG. 17B. The sign information for pixels in column 1712a becomes previously stored information and is used to derive SAO type information for boundary pixels within the current window boundary 1706b. Sign information for column pixels 1712b adjacent to the right side window boundary 1702b and row pixels 1753 below the bottom window boundary 1704b are calculated and stored for SAO processing of subsequent LCUs. The previous window area 1720a becomes fully processed by in-loop filter and one or more adaptive filters (i.e., SAO in this case). Areas 1730b represent pixels processed by horizontal DF and area 1740b represents pixels not yet processed by horizontal DF nor vertical DF. After the current window 1720b is DF processed and SAO processed, the processing pipeline flow moves to the next window. In FIG. 17B, the window consists of two sub-regions (i.e., the white area in LCU 1710a and the white area in LCU 1710b).

FIG. 17C illustrates processing pipeline flow for an LCU at the beginning of a second LCU row of the picture. The current window is indicated by area 1720d having white background and window boundaries 1702d, 1704d and 1708d. The window covers pixels from two LCUs, i.e., LCU 1710a and 1710d. Areas 1760d have been processed by DF and SAO. Areas 1730d have been processed by horizontal DF only and area 1740d has not been processed by neither horizontal DF nor vertical DF. Pixel row 1755 represents sign information calculated and stored for SAO processing of pixels aligned with the top row of the current window. Sign information for pixel row 1757 below the bottom window boundary 1704d and the pixel column 1712d adjacent to the right window boundary 1702d are calculated and stored for determining SAO type information for pixels at corresponding window boundary of subsequent LCUs. After the current window (i.e., LCU_x=0 and LCU_y=1) is completed, the processing pipeline flow moves to the next window (i.e., LCU_x=1 and LCU_y=1). At the next window period, the window corresponding to (LCU_x=1, LCU_y=1) becomes the current window as shown in FIG. 16. In FIG. 17C, the window consists of two sub-regions (i.e., the white area in LCU 1710a and the white area in LCU 1710d).

The example in FIG. 16 illustrates a coding system incorporating an embodiment of the present invention, where a moving window is used to process LCU-based coding with in-loop filter (i.e., DF in this case) and adaptive filter (i.e., SAO in this case). The window is configured to take into consideration the data dependency of underlying in-loop filter and adaptive filters across LCU boundaries. Each moving window includes pixels from 1, 2 or 4 LCUs in order to process all pixels within the window boundaries. Furthermore, additional buffer may be required for adaptive filter processing of pixels in the window. For example, edge sign information for pixels below the bottom window boundary and pixels immediately outside the right side window boundary is calculated and stored for SAO processing of subsequent windows as shown in FIG. 16. While SAO is used as the only adaptive filter in the above example, it may also include additional adaptive filter(s) such as ALF. If ALF is incorporated, the moving window has to be reconfigured to take into account the additional data dependency associated with ALF.

In the example of FIG. 16, the adaptive filter is applied to a current window after the in-loop filter is applied to the current window. In the picture-based system, the adaptive filter cannot be applied to the underlying video data until a whole picture is processed by DF. Upon completion of DF processing for the picture, the SAO information can be determined for the picture and SAO is applied to the picture accordingly. In the LCU-based processing, there is no need to buffer the whole picture and the subsequent adaptive filter can be applied to DF-processed video data without the need to wait for completion of DF processing of the picture. Furthermore, the in-loop filter and one or more adaptive filters can be applied to an LCU concurrently for a portion of the LCU. However, in another embodiment of the present invention, two consecutive loop filters, such as DF and SAO processings or SAO and ALF processings, are applied to two windows that are apart by one or more windows. For example, while DF is applied to a current window, SAO is applied to a previously DF-processed window that is two windows apart from the current window.

While the DF, SAO and ALF processings can be applied concurrently to a portion of the moving window according to embodiments of the present invention as described above, the in-loop filter and adaptive filters may also be applied sequentially within each window. For example, a moving window may be divided into multiple portions, where the in-loop filter and adaptive filters may be applied to portions of the window sequentially. For example, the in-loop filter can be applied to the first portion of the window. After in-loop filtering is complete for the first portion, an adaptive filter can be applied to the first portion. After both the in-loop filter and the adaptive filter are applied to the first portion, the in-loop filter and the adaptive filter can be applied to the second portion of the window sequentially.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of encoding video data, the method comprising:
   generating prediction residues from original video data and prediction signal;
   generating reconstructed video data from processed prediction residues and the prediction signal;
   estimating first adaptive filter parameters of a first adaptive filter based on the original video data and pre-in-loop video data before being processed by an in-loop filter, wherein the pre-in-loop video data corresponds to the reconstructed video data or processed reconstructed video data;
   processing the pre-in-loop video data utilizing the in-loop filter to generate first processed video data;
   processing the first processed video data utilizing the first adaptive filter with the first adaptive filter parameters estimated to generate second processed video data,
   estimating second adaptive filter parameters of a second adaptive filter for the image unit based on the original video data and the pre-in-loop video data of the image unit;
   applying the second adaptive filter to the second processed video data utilizing the second adaptive filter parameters estimated;
   wherein the in-loop filter is a filter that operates on underlying video data without side information incorporated in the video bitstream, and the first adaptive filter is a filter that operates on the underlying video data using side information incorporated into the video bitstream, and
   wherein either the in-loop filter, the first adaptive filter and the second adaptive filter are applied concurrently for at least one portion of the current moving window, or the second adaptive filter is applied to a third moving window concurrently, wherein the third moving window is delayed from the second moving window by one or more moving windows.

2. The method of claim 1, wherein the first adaptive filter parameters are determined for an individual image unit of a current picture.

3. The method of claim 2, wherein said estimating the first adaptive filter parameters further depends on previously estimated first adaptive filter parameters of neighboring image units.

4. The method of claim 1, wherein said estimating the first adaptive filter parameters of the first adaptive filter is further based on partial first processed video data.

5. The method of claim 1, wherein the first adaptive filter parameters are incorporated in a video bitstream associated with the video data.

6. The method of claim 1, wherein the in-loop filter corresponds to a deblocking filter.

7. The method of claim 1, wherein the first adaptive filter corresponds to Sample Adaptive Offset (SAO).

8. The method of claim 1, wherein the first adaptive filter corresponds to Adaptive Loop Filter (ALF).

9. The method of claim 1, further comprising:
processing the second processed video data utilizing the second adaptive filter with the second adaptive filter parameters estimated.

10. The method of claim 9, wherein the first adaptive filter corresponds to Sample Adaptive Offset (SAO) and the second adaptive filter corresponds to Adaptive Loop Filter (ALF).

11. The method of claim 9, wherein said estimating the second adaptive filter parameters of the second adaptive filter is further based on partial first processed video data.

12. The method of claim 1, further comprising:
estimating second adaptive filter parameters of a second adaptive filter based on the original video data and the first processed video data; and
processing the second processed video data utilizing the second adaptive filter with the second adaptive filter parameters estimated.

13. The method of claim 12, wherein said estimating the second adaptive filter parameters of the second adaptive filter is further based on partial second processed video data.

14. A method of encoding video data, the method comprising:
generating prediction residues from original video data and prediction signal;
generating reconstructed video data from processed prediction residues and the prediction signal;
estimating first adaptive filter parameters of a first adaptive filter for an image unit based on the original video data and pre-in-loop video data of the image unit before being processed by an in-loop filter, wherein the pre-in-loop video data corresponds to the reconstructed video data or processed reconstructed video data;
processing a moving window of the pre-in-loop video data utilizing the in-loop filter and the first adaptive filter, wherein the moving window comprises one or more sub-regions from corresponding one or more image units of a current picture;
estimating second adaptive filter parameters of a second adaptive filter for the image unit based on the original video data and the pre-in-loop video data of the image unit;
applying the second adaptive filter to the second processed video data utilizing the second adaptive filter parameters estimated;
wherein the in-loop filter and the first adaptive filter are applied concurrently for at least one portion of a current moving window, or the first adaptive filter is applied to a second moving window and the in-loop filter is applied to a first moving window concurrently, wherein the second moving window is delayed from the first moving window by one or more moving windows;
wherein the in-loop filter is applied to the pre-in-loop video data to generate first processed data;
the first adaptive filter is applied to the first processed data using the first adaptive filter parameters estimated to generate second processed video data, wherein the in-loop filter is a filter that operates on underlying video data without side information incorporated in the video bitstream, and the first adaptive filter is a filter that operates on the underlying video data using side information incorporated into the video bitstream, and wherein either the in-loop filter, the first adaptive filter and the second adaptive filter are applied concurrently for at least one portion of the current moving window, or the second adaptive filter is applied to a third moving window concurrently, wherein the third moving window is delayed from the second moving window by one or more moving windows.

15. The method of claim 14, wherein said estimating the first adaptive filter parameters of the first adaptive filter is further based on partial first processed video data.

16. The method of claim 14, wherein said estimating the second adaptive filter parameters of the second adaptive filter is further based on partial second processed video data.

17. The method of claim 14, wherein the in-loop filter corresponds to a deblocking filter.

18. The method of claim 14, wherein the first adaptive filter corresponds to Sample Adaptive Offset (SAO).

19. The method of claim 14, further comprising:
determining at least partial data dependency associated with the first adaptive filter for at least partial boundary pixels of the moving window; and
storing said at least partial data dependency of said at least partial boundary pixels, wherein said at least partial data dependency of said at least partial boundary pixels is used for the first adaptive filter of subsequent moving windows.

20. The method of claim 19, wherein the first adaptive filter corresponds to Sample Adaptive Offset (SAO), said at least partial data dependency is associated with type information of the SAO, and said at least partial boundary pixels include boundary pixels of right side or bottom side of the moving window.

21. The method of claim 14, wherein the moving window is configured according to data dependency related to the in-loop filter at image unit boundaries.

22. The method of claim 21, wherein the moving window is further configured according to data dependency related to the first adaptive filter at the image unit boundaries.

23. The method of claim 14, wherein the image unit corresponds to a Largest Coding Unit (LCU) or a Macroblock (MB).

24. An apparatus for encoding video data, the apparatus comprising:
means for generating prediction residues from original video data and prediction signal;
means for generating reconstructed video data from processed prediction residues and the prediction signal;
means for estimating first adaptive filter parameters of a first adaptive filter based on the original video data and pre-in-loop video data before being processed by an in-loop filter, wherein the pre-in-loop video data corresponds to the reconstructed video data or processed reconstructed video data;
means for processing the pre-in-loop video data utilizing the in-loop filter to generate first processed video data;
means for processing the first processed video data utilizing the first adaptive filter with the first adaptive filter parameters estimated to generate second processed video data, means for estimating second adaptive filter parameters of a second adaptive filter for the image unit based on the original video data and the pre-in-loop video data of the image unit; and means for applying the second adaptive filter to the second processed video data utilizing the second adaptive filter parameters estimated;

wherein the in-loop filter is a filter that operates on underlying video data without side information incorporated in the video bitstream, and the first adaptive filter is a filter that operates on the underlying video data using side information incorporated into the video bitstream; and wherein either the in-loop filter, the first adaptive filter and the second adaptive filter are applied concurrently for at least one portion of the current moving window, or the second adaptive filter is applied to a third moving window concurrently, wherein the third moving window is delayed from the second moving window by one or more moving windows.

25. The apparatus of claim 24, further comprising:
means for processing the second processed video data utilizing the second adaptive filter with the second adaptive filter parameters estimated.

26. An apparatus of encoding video data, the apparatus comprising:
means for generating prediction residues from original video data and prediction signal;
means for generating reconstructed video data from processed prediction residues and the prediction signal;
means for estimating first adaptive filter parameters of a first adaptive filter for an image unit based on the original video data and pre-in-loop video data of the image unit before being processed by an in-loop filter, wherein the pre-in-loop video data corresponds to the reconstructed video data or processed reconstructed video data;
means for processing a moving window of the pre-in-loop video data utilizing the in-loop filter and the first adaptive filter, wherein the moving window comprises one or more sub-regions from corresponding one or more image units of a current picture;
means for estimating second adaptive filter parameters of a second adaptive filter for the image unit based on the original video data and the pre-in-loop video data of the image unit;
means for applying the second adaptive filter to the second processed video data utilizing the second adaptive filter parameters estimated; and wherein either the in-loop filter and the first adaptive filter are applied concurrently for at least one portion of a current moving window, or the first adaptive filter is applied to a second moving window and the in-loop filter is applied to a first moving window concurrently, wherein the second moving window is delayed from the first moving window by one or more moving windows;

wherein the in-loop filter is applied to the pre-in-loop video data to generate first processed data; and the first adaptive filter is applied to the first processed data using the first adaptive filter parameters estimated to generate second processed video data, wherein the in-loop filter is a filter that operates on underlying video data without side information incorporated in the video bitstream, and the first adaptive filter is a filter that operates on the underlying video data using side information incorporated into the video bitstream;

wherein either the in-loop filter, the first adaptive filter and the second adaptive filter are applied concurrently for at least one portion of the current moving window, or the second adaptive filter is applied to a third moving window concurrently, wherein the third moving window is delayed from the second moving window by one or more moving windows.

* * * * *